United States Patent
Lee et al.

(10) Patent No.: US 10,067,269 B2
(45) Date of Patent: Sep. 4, 2018

(54) ANTI-FINGERPRINT FILM AND ELECTRICAL AND ELECTRONIC APPARATUS

(71) Applicant: LG CHEM, LTD., Seoul (KR)

(72) Inventors: Eun Jeong Lee, Daejeon (KR); Su Jin Kim, Daejeon (KR); Ki-Hwan Kim, Daejeon (KR); Sung Joon Oh, Daejeon (KR); Jin Hyong Lim, Daejeon (KR); Yeon Joo Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 736 days.

(21) Appl. No.: 14/421,728

(22) PCT Filed: Aug. 1, 2014

(86) PCT No.: PCT/KR2014/007138
§ 371 (c)(1),
(2) Date: Feb. 13, 2015

(87) PCT Pub. No.: WO2015/016679
PCT Pub. Date: Feb. 5, 2015

(65) Prior Publication Data
US 2015/0346392 A1 Dec. 3, 2015

(30) Foreign Application Priority Data

Aug. 2, 2013 (KR) .................. 10-2013-0092078
Aug. 2, 2013 (KR) .................. 10-2013-0092079

(Continued)

(51) Int. Cl.
*C08J 5/18* (2006.01)
*G02B 1/18* (2015.01)
(Continued)

(52) U.S. Cl.
CPC ........ *G02B 1/18* (2015.01); *C08J 5/18* (2013.01); *G02B 27/0006* (2013.01); *G09F 9/00* (2013.01);
(Continued)

(58) Field of Classification Search
None
See application file for complete search history.

(56) References Cited

U.S. PATENT DOCUMENTS

| | | | |
|---|---|---|---|
| 5,944,405 | A | 8/1999 | Takeuchi et al. |
| 2002/0044356 | A1 | 4/2002 | Arakawa et al. |

(Continued)

FOREIGN PATENT DOCUMENTS

| | | |
|---|---|---|
| CN | 102634267 A | 8/2012 |
| EP | 0875360 A2 | 11/1998 |

(Continued)

OTHER PUBLICATIONS

English machine translation of KR 101197029, EPO, accessed Aug. 23, 2017.*

(Continued)

*Primary Examiner* — Humera N Sheikh
*Assistant Examiner* — Xiaobei Wang
(74) *Attorney, Agent, or Firm* — Dentons US LLP

(57) ABSTRACT

This disclosure relates to an anti-fingerprint film with low interaction energy that includes nanoscale or microscale microprojections having a contact side with the film, the upper side facing therewith, and a side wall connecting the contact side and the upper side, and has a shape such that the internal angle formed by the side wall and the film is an obtuse angle, an anti-fingerprint film including predetermined linear micropatterns or a continuous phase micropattern, and an electrical and electronic apparatus including the anti-fingerprint film.

12 Claims, 11 Drawing Sheets

(30) Foreign Application Priority Data

| | | |
|---|---|---|
| Aug. 2, 2013 | (KR) | 10-2013-0092081 |
| Aug. 1, 2014 | (KR) | 10-2014-0098901 |
| Aug. 1, 2014 | (KR) | 10-2014-0098903 |
| Aug. 1, 2014 | (KR) | 10-2014-0098904 |

(51) Int. Cl.
 *G09F 9/00* (2006.01)
 *G02B 27/00* (2006.01)

(52) U.S. Cl.
 CPC ............ *Y10T 428/12396* (2015.01); *Y10T 428/24802* (2015.01); *Y10T 428/24868* (2015.01); *Y10T 428/24917* (2015.01)

(56) References Cited

U.S. PATENT DOCUMENTS

| | | |
|---|---|---|
| 2010/0119774 A1 | 5/2010 | Ogawa |
| 2010/0279068 A1 | 11/2010 | Cook et al. |
| 2010/0285272 A1 | 11/2010 | Koval et al. |
| 2010/0316842 A1 | 12/2010 | Tuteja et al. |
| 2011/0027506 A1 | 2/2011 | Mittelbach et al. |
| 2011/0128629 A1 | 6/2011 | Takahashi et al. |
| 2011/0229667 A1 | 9/2011 | Jin et al. |
| 2012/0107556 A1 | 5/2012 | Zhang et al. |
| 2013/0149496 A1 | 6/2013 | Mazumder et al. |
| 2013/0157007 A1 | 6/2013 | Carrilero et al. |
| 2013/0157008 A1 | 6/2013 | Aytug et al. |
| 2013/0182328 A1* | 7/2013 | Stewart ............ G02B 1/118 359/580 |

FOREIGN PATENT DOCUMENTS

| | | | | |
|---|---|---|---|---|
| JP | 08-055507 A | 2/1996 | | |
| JP | 2001-264520 A | 9/2001 | | |
| JP | 2008-247699 A | 10/2008 | | |
| JP | 2011-509192 A | 3/2011 | | |
| JP | 2011-076072 A | 4/2011 | | |
| JP | 2013097306 | 5/2013 | | |
| KR | 10-2007-0015079 A | 2/2007 | | |
| KR | 1020070044437 | 4/2007 | | |
| KR | 100773588 | 10/2007 | | |
| KR | 100817101 | 3/2008 | | |
| KR | 1020090020008 | 2/2009 | | |
| KR | 1020100000711 | 1/2010 | | |
| KR | 1020100008579 | 1/2010 | | |
| KR | 1020100105241 | 9/2010 | | |
| KR | 1020110053333 | 5/2011 | | |
| KR | 1020110072931 | 6/2011 | | |
| KR | 1020110139228 | 12/2011 | | |
| KR | 1020120013672 | 2/2012 | | |
| KR | 101310436 | 9/2013 | | |
| WO | WO2011072227 | * | 6/2011 | ............ G02B 1/11 |
| WO | 2012088209 | 6/2012 | | |

OTHER PUBLICATIONS

Christiansen et al: "Thin anti-fouling film deposition on commerically available ceramic membrane filters", Institute of Physics and Nanotechnology at Aalborg University, 2012, pp. 11-24.

Im, Maesoon, et al., "A robust superhydrophobic and superoleophobic surface with inversetrapezoidal microstructures on a large transparent flexible substrate," Soft Matter, 2010, 6, pp. 1401-1404.

Anish Tuteja, et al., Robust omniphobic surfaces, PNAS, Nov. 25, 2008, pp. 18200-18205,vol. 105, No. 47.

* cited by examiner

ANTI-FINGERPRINT FILM AND ELECTRICAL AND ELECTRONIC APPARATUS

This application is a National Stage Application of International Application No. PCT/KR2014/007138, filed Aug. 1, 2014, and claims the benefit of Korean Patent Application No. 10-2013-0092078 filed on Aug. 2, 2013, Korean Patent Application No. 10-2013-0092079 filed on Aug. 2, 2013, Korean Patent Application No. 10-2013-0092081 filed on Aug. 2, 2013, Korean Patent Application No. 10-2014-0098901 filed on Aug. 1, 2014, Korean Patent Application No. 10-2014-0098903 filed on Aug. 1, 2014, and Korean Patent Application No. 10-2014-0098904 filed on Aug. 1, 2014, all of which are hereby incorporated by reference in their entirety for all purposes as if fully set forth herein.

FIELD OF THE INVENTION

The present invention relates to an anti-fingerprint film and an electrical and electronic apparatus, more particularly to an anti-fingerprint film that may minimize transcription of fingerprint on the surface of a product and yet allow easy removal of a transcribed fingerprint, and may simultaneously realize outstanding water repellency and oil repellency, and an electrical and electronic apparatus including the anti-fingerprint film.

BACKGROUND OF THE INVENTION

During the use of electronic products such as a display device and the like, the exterior may be stained with fingerprints and thus contaminated due to the transcription of a fingerprint, and in the case of a display device, screen contrast is degraded.

Fingerprints mostly consist of sweat and sebum, and contaminants such as keratin that came off from the skin and dust from the outside are included therein. The main component of the fingerprint transcribed on the electronic product is sebum, which is known to include triglyceride, wax monoester, fatty acid, squalene, trace amounts of cholesterol and cholesteryl ester, and the like. Further, the constitutional elements of sebum have very low surface tension (surface tension of 30 to 35 mN/m) compared to water (surface tension of 72 mN/m), and thus fingerprints tend to easily stain the surface of any material.

In order to afford an anti-fingerprinting property to electronic products such as a display device, a method of forming a specific pattern on the outer surface of a product, a method of lowering visibility by broadly spreading the oil components of the fingerprint through a lipophilic coating, and the like are known.

Specifically, in the method of securing an anti-fingerprinting property by forming a specific pattern on the outer surface of a product, particles or patterns of a microsize are formed on the outside of a product, thereby forming surface texturing which increases haze, and thus, even if the product is stained with a fingerprint, it is not easily seen. For example, Korean Patent Application No. 2007-0084369 discloses a superhydrophobic substrate having protruded structures connected in a network, Korean Laid-Open Patent Publication No. 2010-0105241 discloses an anti-fingerprint pattern having a specific height and width, and Korean Patent Application No. 2011-7003244 discloses a pattern consisting of projections of the shape of a truncated pyramid, a circular truncated cone, a compound parabola, a compound oval, a polyobject, or a three-dimensional rotatory body of a conic section.

However, according to the previously known method of forming specific patterns or projections, haze becomes 10% or more, thus lowering screen contrast in a display device and the like, or when a fingerprint is excessively transcribed, the fingerprint may penetrate into the texturing of the surface and become difficult to remove.

Meanwhile, the lipophilic coating affords visibility by spreading sebum, which is a main factor causing an inferior exterior property, thinly and broadly. However, while the lipophilic coating has high transmittance and low haze, it conceals a stained fingerprint rather than decreasing the stained amount of the fingerprint, and thus it cannot reduce the transcribed amount of the fingerprint itself, and if the fingerprint is excessively transcribed and stacked, it is not easy to completely remove it.

A method of securing anti-contamination by lowering surface energy of the exterior of a product using a coating material including a fluorine-based compound is also known. However, according to the coating of a material including a fluorine-based compound, contact angles to water and oil may become large thus increasing water repellency and oil repellency, but it is not sufficient to secure such properties to prevent transcription of a fingerprint, for example, outstanding water repellency and oil repellency. Further, it is also difficult to sufficiently reduce a transcribed amount of fingerprint by this method, and it is not easy to remove an attached fingerprint.

Accordingly, there is a demand for the development of an anti-fingerprint product that may minimize transcription of fingerprints onto the surface of a product, and yet allow easy removal of a transcribed fingerprint, and a method for realizing the same.

PRIOR ART

Patent Document (Patent Document 0001) Korean Patent Application No. 2007-0084369
(Patent Document 0002) Korean Laid-Open Patent Publication No. 2010-0105241
(Patent Document 0003) Korean Patent Application No. 2011-7003244

DETAILED DESCRIPTION OF THE INVENTION

Technical Objectives

It is an object to provide an anti-fingerprint film that may minimize transcription of fingerprints onto the surface of a product and yet allow easy removal of a transcribed fingerprint, and may simultaneously realize high light transmittance, low haze, and outstanding water repellency and super oil repellency.

It is another object to provide an electrical and electronic apparatus including the anti-fingerprint film.

Technical Solutions

There is provided an anti-fingerprint film including nanoscale or microscale microprojections having a contact side with the film, the upper side facing thereto, and a side wall connecting the contact side and the upper side, and having a shape such that an internal angle formed by the side wall and the contact side with the film is an obtuse angle, and wherein interaction energy ($K_A$) as defined by the following General Formula 1 is 3 mJ/m² or less.

$$K_A = \left[ \left\{ \frac{\rho(2 - 3\cos\theta' + \cos^3\theta')}{3} \right\}^{1/3} \right] \frac{g}{2} \frac{(1 + \cos\theta')}{(1 + \cos\theta)} \left( \frac{m}{\pi} \right)^{2/3} \frac{\sin\alpha}{\sin\theta'}$$

[General Formula 1]

In the General Formula 1, $\alpha$ is a sliding angle of liquid put on the film including microprojections, $\theta'$ is a contact angle formed by the film including microprojections and the liquid, $\theta$ is a contact angle formed by the flat film and the liquid, $\rho$ is the density of the liquid, m is the weight of the liquid, and g is gravitational acceleration.

There is also provided an anti-fingerprint film including two or more linear micropatterns including a contact side with the film, the upper side facing therewith, and a side wall connecting the contact side and the upper side, and having such a three-dimensional shape that an internal angle formed by the side wall and the contact side with the film is an obtuse angle.

There is also provided an anti-fingerprint film including a continuous phase micropattern including a contact side with the film, the upper side facing therewith, and a side wall connecting the contact side and the upper side, and having such a three-dimensional shape that an internal angle formed by the side wall and the contact side with the film is an obtuse angle There is also provided an electrical and electronic apparatus including the anti-fingerprint film.

Hereinafter, an anti-fingerprint film and an electrical and electronic apparatus according to specific embodiments will be explained in detail.

As used herein, the term 'film' refers to an object with the shape of a thin membrane, the material is not specifically limited, and for example, it may include an organic substance such as a polymer and the like or an inorganic substance such as a metal, silicon, and the like.

According to one embodiment of the invention, an anti-fingerprint film including nanoscale or microscale microprojections having a contact side with the film, the upper side facing therewith, and a side wall connecting the contact side and the upper side, and having such a shape that an internal angle formed by the side wall and the contact side with the film is an obtuse angle, and wherein interaction energy ($K_A$) as defined by the above General Formula 1 is 3 mJ/m² or less.

The anti-fingerprint film, on the surface of which microprojections having the above characteristic shape are formed, may have interaction energy ($K_A$) defined by the above General Formula 1 of 0.5 mJ/m² to 2.0 mJ/m². The anti-fingerprint film may have an extremely high contact angle and high repellency to an organic component that can be included in the fingerprint as well as to water, and it may minimize the amount of transcribed fingerprint and yet allow easy removal of a transcribed fingerprint.

The anti-fingerprint film has relatively low interaction energy with a liquid or organic substance, for example, interaction energy ($K_A$) as defined by the General Formula 1, and thus it exhibits low interaction with an organic component that can be included in the fingerprint or water.

Further, since the anti-fingerprint film has low interactivity with liquids or organic substances, it has a relatively small sliding angle to liquids. For example, the angle at which oleic acid forms an inclination to the horizontal plane and begins to be clouded when 30 µl of oleic acid is put on the anti-fingerprint film, namely the sliding angle, may be 20° or less, or 0° to 20°.

Specifically, since the anti-fingerprint film exhibits low interactivity with an organic component or a water component that can be included in the fingerprint and simultaneously exhibits a low sliding angle to the above components, it may largely reduce the amount of fingerprint transcribed on the surface, prevent a transcribed fingerprint from remaining on the surface of the film, and allow easy removal of a transcribed fingerprint itself.

Meanwhile, the anti-fingerprint film may have a high contact angle to oleic acid or distilled water, for example, it may have a contact angle of 120° or more, or 130° to 160° respectively to 3 µl of oleic acid and 3 µl of distilled water. That is, the anti-fingerprint film may realize a Cassie-Baxter state both for an organic component and a water component, and it may simultaneously have outstanding water repellency and oil repellency.

Thus, the anti-fingerprint film may exhibit high repellency or a high contact angle to fingerprint components including oleic acid and the like as well as moisture. The fingerprint component refers to a moisture or sebum component, wherein the sebum component means triglyceride, wax monoester, fatty acid, squalene, cholesterol and cholesteryl ester, and the like, in addition to oleic acid.

If a fingerprint or liquid is transcribed on the anti-fingerprint film, the microprojections and the base side of the anti-fingerprint film form an air pocket in a predetermined space formed inside, thus affording high repellency and a high contact angle to the components included in the fingerprint or water.

The microprojection refers to a structure that is formed so as to protrude outside the anti-fingerprint film, and has a height or width of a nanometer or micrometer unit.

The height of the microprojection means the longest length in the direction of protrusion, and the width of the microprojection means the longest diameter in a direction perpendicular to the protrusion. Further, even in the case the microprojection is formed of a single material or two or more materials, or includes a plurality of stacked structures, the height and the width of the microprojection may be defined as the height and the width of the external structure or shape that can be recognized as one structure or shape.

As explained above, the microprojection may have a contact side with the film, the upper side facing therewith, and a side wall connecting the contact side and the upper side, and may have such a shape that an internal angle formed by the side wall and the contact side with the film is an obtuse angle That is, the cross-sectional diameter of the microprojection may increase from the contact side with the film to the upper side.

The contact side with the film means the lower side at which the microprojection contacts the base side of the anti-fingerprint film. Further, the upper side means the top side that is located on the uppermost part of the height direction of the microprojection and faces the contact side. The side wall forms a side of the three-dimensional shape of the microprojection.

The properties of the anti-fingerprint film appear to be derived from a ratio of the longest diameter of the upper side of one microprojection to the distance between the upper side of one microprojection and the upper side of the neighboring microprojection, together with the shape characteristics of the microprojection.

Specifically, the anti-fingerprint film may include two or more microprojections of the above-explained shape, and a ratio (D/P) of the longest diameter (D) of the upper side of one of the microprojections to a sum (P) of the distance between the upper sides of two neighboring microprojections and the longest diameter of the upper side of one of the microprojections may be 0.1 to 0.7, and thereby, the above-explained intrinsic properties of the anti-fingerprint film may be realized.

The distance between the upper side of one microprojection and the upper side of the neighboring microprojection means the shortest distance between the upper sides of the two neighboring microprojections.

As explained, as the distance between the upper sides of neighboring microprojections and the longest diameter of the upper side of one microprojection has a ratio of the above-explained range, a contact angle to water or an organic component that is transcribed on the surface may be further increased, the contact area of the above components may be reduced, and an air pocket may be more easily formed and maintained in a space defined by the microprojection and the base side of the film.

Further, lower interaction energy with organic components or water may be afforded to the water repellent and oil repellent film, thus minimizing the amount of transcribed organic components or moisture, and allowing easy removal of transcribed organic substance.

If the ratio (D/P) of the longest diameter (D) of the upper side of one of the microprojections to the sum (P) of the distance between the upper sides of the two neighboring microprojections and the longest diameter of the upper side of one of the microprojections is too small, for example, if the (P) is too large, an air pocket formed in a space defined by the microprojection and the base side of the film may easily collapse.

Further, if the ratio (D/P) of the longest diameter (D) of the upper side of one of the microprojections to the sum (P) of the distance between the upper sides of the two neighboring microprojections and the longest diameter of the upper side of one of the microprojections is too large, it may be difficult for a space defined by the microprojection and the base side of the film to have an appropriate volume or shape for the formation of an air pocket.

Although a film that has a specific pattern or projection formed outside and thus has water repellency above a certain level has been previously known, in the previously known film, a phenomenon appeared that an air pocket collapses over time, or by external pressure or gravity acting on a liquid, or capillarity, an organic component or moisture transcribed on the surface penetrates inside.

However, due to the shape characteristics of the microprojections included in the anti-fingerprint film and the surface properties according to the ratio (D/P) of the longest diameter (D) of the upper side of one of the microprojections to the sum (P) of the distance between the upper sides of the neighboring two microprojections and the longest diameter of the upper side of one of the microprojections, the collapse of the air pocket over time, or by external pressure, gravity acting on a liquid, capillarity, and the like, may be prevented, and the penetration of organic components or moisture may be prevented.

The microprojection may have a height of 0.1 µm to 40 µm, 1 µm to 20 µm, or 5 µm to 15 µm. The height of the microprojection may be defined as the longest distance from the base side of the film to the upper side of the microprojection.

If the height of the microprojection is too small, it may be difficult for a space defined by the microprojection and the base side of the film to have an appropriate volume or shape for the formation of an air pocket, or a formed air pocket may easily collapse, and the external surface of the film may have structural characteristics or surface characteristics that are not substantially different from a plane without microprojections, and thus it may be difficult to simultaneously secure the above-explained water repellency and oil repellency. Further, if the height of the microprojection is too large, the mechanical hardness or physical properties of the film or microprojection itself may be degraded.

The longest diameter of the upper side of the microprojection may be 0.2 µm to 100 µm, or 1 µm to 50 µm, or 3 µm to 30 µm.

If the longest diameter of the upper side of the microprojection is too large, the ratio of the area occupied by the upper side of the microprojection on the surface of the film may become too large, or the contact area of organic components or moisture to the film may become too broad, and thus the film may not simultaneously secure the above-explained water repellency and oil repellency.

Further, if the longest diameter of the microprojection is too small, mechanical durability of the microprojection may be remarkably lowered, and the sum (P) of the distance between the upper sides of two neighboring microprojections and the longest diameter of the upper side of one of the microprojections should be decreased in proportion to the longest diameter (D) of the microprojection, so as to satisfy the optimum range of the ratio (D/P), and thus it may be difficult to have an appropriate volume or shape for the formation of an air pocket, and the external surface may not be substantially different from a plane without microprojections because of the excessively small upper side of the microprojection, and thus it may be difficult to simultaneously secure the above-explained water repellency and oil repellency.

The internal angle formed by the side wall and the contact side with the film may be 100° to 170°, or 110° to 150°. Thus, the width of the cross-section of the microprojection in a direction parallel to the base side of the anti-fingerprint film may gradually increase according to the inclination of a certain angle from the first width.

As the internal angle formed by the side wall and the contact side of the film (angle formed into the three-dimensional structure of the microprojection) is 100° to 170°, an air pocket may be more easily formed on the anti-fingerprint film of one embodiment, and higher repellency and higher contact angle to liquids including water or organic components may be realized.

The microprojection may have a rounded curve at the end of the upper side according to the preparation method. As such, if the end of the upper side has a rounded curve, the distance between the upper sides of neighboring microprojections may be defined as the shortest distance between the rounded curves of the neighboring microprojections.

Meanwhile, the microprojection may further include a plate-shaped part having a larger area than the upper side. The plate-shaped part may be formed or stacked on the upper side of the microprojection. Due to the existence of the plate-shaped part, a contact angle to moisture or organic components transcribed on the surface may become very large, and the area where the organic component or moisture contacts the anti-fingerprint film may be minimized.

Further, the plate-shaped part of the microprojection may cover an air pocket formed in the internal structure of the anti-fingerprint film, thus preventing the collapse of the air pocket, and it may partly support moisture or organic components transcribed on the surface of the anti-fingerprint film, thus preventing the penetration thereof inside of the anti-fingerprint film.

The plate-shaped part may have a larger area than the upper side of the microprojection. That is, the plate-shaped part may contact the whole area of the upper outermost side of the protruded direction of a column part, and yet have a larger area than the upper side. Although the area of the plate-shaped part is not specifically limited, it may be 1.2 to 10 times the area of the upper side of the microprojection. If the area of the plate-shaped part is too small, the effect resulting from the inclusion of the plate-shaped part may be insignificant. Further, if the area of the plate-shaped part is too large, mechanical strength of the outside of the film may be lowered, and the structure of the microprojection may easily collapse.

Although the shape of the plate-shaped part is not specifically limited, for example, the cross-section of the plate-shaped part in the direction of the base side may form a circle, an oval, or a polygon having 3 to 20 internal angles. The cross-section of the plate-shaped part in the direction of the base side of the film means the cross-section of the plate-shaped part in a direction parallel to the base side of the film.

Further, the cross-section of the plate-shaped part in a direction perpendicular to the base side may be a rectangle, a trapezoid, or a reversed trapezoid.

The largest diameter of the plate-shaped part of the microprojection may be 0.1 μm to 100 μm, or 0.2 μm to 50 μm. If the largest diameter of the plate-shaped part is too large, the area occupied by the plate-shaped part on the surface of the anti-fingerprint film may become too large, or the area where an organic component or moisture contacts the film may become too broad, and thus the film may have substantially the same surface structure or properties as common flat films. Further, if the largest diameter of the plate-shaped part is too small, the microprojection may have substantially the same shape as a microprojection without a plate-shaped part, or three-dimensional structural properties resulting from the plate-shaped part may be difficult to manifest when an organic component or moisture contacts the anti-fingerprint film.

The thickness of the microprojection may be 0.05 μm to 10 μm, or 0.2 μm to 2 μm. If the thickness of the plate-shaped part is too small, mechanical properties of the outside of the anti-fingerprint film may be lowered, and if the thickness of the plate-shaped part is too large, an air pocket may not be easily formed in a space defined by the base side and the microprojection.

Meanwhile, the anti-fingerprint film may further include a fluorine-based compound layer stacked on the outside of the microprojection. That is, the microprojection may include a fluorine-based compound layer formed on the external surface of the above specific shape. The fluorine-based compound layer may further increase contact angle and repellency to moisture or organic components included in the fingerprint, and it may decrease the area where these components contact the outside of the anti-fingerprint film. That is, the fluorine-based compound layer may increase water repellency and oil repellency that are realized due to the specific structure of the microprojection.

Further, the fluorine-based compound layer has high repellency to fingerprint components, organic components, moisture components, and the like, which are transcribed on the anti-fingerprint film, and thus the collapse of an air pocket over time, or by external pressure or gravity acting on a liquid, or capillarity and the like, and the resulting penetration of these transcribed components inside the film may be prevented.

The fluorine-based compound layer may have a thickness of 5 nm to 5 μm, or 10 nm to 1 μm.

Further, in case the microprojection includes the above-explained plate-shaped part, the fluorine-based compound layer may have a thickness of 30 nm to 5 μm, or 50 μm to 1 μm at the upper side (outermost side in the protruded direction of the microprojection) of the plate-shaped part, and it may have a thickness of 5 nm to 1 μm, or 10 nm to 300 nm at the lower side of the plate-shaped part facing the upper side. Further, on the column part of the microprojection, a fluorine-based compound layer having a thickness of 5 nm to 1 μm, or 10 nm to 300 nm, may be formed.

The fluorine-based compound layer may include a fluorine-based unimolecular compound, a fluorine-based polymer compound, or a mixture thereof.

The fluorine-based unimolecular compound may be a siloxane-based molecule including fluorine-substituted aliphatic, cycloaliphatic, or aromatic functional groups, or a perfluoropolyether-based compound, and the compound or molecule may include a functional group such as epoxy silane, methoxy silane, chlorosilane, and the like, which can be bonded to the microprojection or the surface of the film according to one embodiment, at the end.

The fluorine-based polymer compound may include a polymer or copolymer synthesized using reactive monomers including a fluorine-containing functional group.

Specifically, the fluorine-based polymer compound may include a (meth)acrylate-based polymer compound substituted by a fluorine-based functional group. The (meth)acrylate-based polymer compound substituted by a fluorine-based functional group may be obtained by polymerizing or copolymerizing a C1-12 perfluoroalkyl(meth)acrylate, pentafluorophenyl(meth)acrylate, or pentafluorobenzyl(meth)acrylate, or a mixture thereof.

Further, the fluorine-based polymer compound may include polytetrafluoroethylene, polytetrafluoroethylene oxide, polyhexafluoropropylene oxide, or a mixture thereof.

The fluorine-based compound layer may be formed on the outer surface of the microprojection through various coating methods or deposition methods, or it may be stacked on the base side of the film as well as on the microprojection.

The fluorine-based compound layer may be formed on the outer surface of the microprojection through various coating methods or deposition methods, or it may be stacked on the base side of the film as well as on the microprojection.

For the formation or stacking of the fluorine-based compound layer, various coating methods or deposition methods may be used, and in order to form a fluorine-based compound layer having more uniform and appropriate thickness, thermal deposition, hot wire chemical vapor deposition (HW-CVD), or radical polymerization may be used.

If the hot wire chemical vapor deposition (HW-CVD) method is used, a fluorine-based compound layer having uniform thickness over the whole area of microprojections including a column part and a plate-shaped part may be formed, and particularly, a fluorine-based compound layer having uniform thickness may also be formed on the lower side of the plate-shaped part of the microprojection or on the part where the column part and the plate-shaped part contact each other.

Thus, the fluorine-based compound layer may be formed by stacking the fluorine-based polymer resin or a precursor thereof on the outside of the microprojections using a hot wire chemical vapor deposition method.

The microprojection may include various materials according to the preparation method, and each part of the microprojection may consist of the same or different materials.

Specifically, the microprojection may include at least one selected from the group consisting of glass, silicon, silicon doped with a metal, polysilicon, a silicon-based polymer, a metal urethane resin, a polyimide resin, a polyester resin, a (meth)acrylate-based polymer resin, a polyolefin resin such as polyethylene, polypropylene, and the like, and a photosensitive polymer resin.

For example, a plate-shaped part of the microprojection may be formed by forming a pattern of the plate-shaped part on a substrate including components that can be used as the material of the microprojection using an etching mask, and etching it, and thereafter, remaining material may be etched to form a column part of the micropattern.

Further, the micropattern may be formed by stacking a component making up a column part of the microprojection on a predetermined substrate, stacking a component making up a plate-shaped part thereon, forming a pattern of the shape of the plate-shaped part using an etching mask, and sequentially etching the material making up the plate-shaped part and the material making up the column part.

In addition, the microprojection may be formed by coating a photosensitive resin composition on a predetermined substrate (for example, a silicon substrate, an organic substrate, a polymer substrate, and the like), exposing it to light, and alkali-developing it to form a specific pattern. For example, a microprojection in the shape of a reverse circular truncated cone having inclination on the side may be formed by coating a photosensitive resin composition on a predetermined substrate, and then using a photomask of a specific pattern, exposing it to light at the protruded direction of the microprojection or the rear direction thereof, and developing it.

The anti-fingerprint film according to the above-explained embodiment may include microprojections including a contact side with the film, a side wall that is formed so as to form an obtuse internal angle with the contact side with the film, and the upper side that is connected to the side wall while forming a curved surface, wherein a ratio (r/D) of the internal radius of curvature (r) of the curved surface at which the side wall and the upper side are connected to the width (D) of the microprojection is 0.1 or less, or 0.01 to 0.05.

The high transparency low haze anti-fingerprint film, on the surface of which microprojections having a specific three-dimensional shape are formed, may have an extremely high contact angle and high repellency to organic components that can be included in the fingerprint as well as to water, and it may minimize the amount of transcribed fingerprint and yet allow easy removal of a transcribed fingerprint.

Specifically, as the ratio (r/D) of the internal radius of curvature (r) of the curved surface at which the side wall and the upper side are connected to the width (D) of the microprojection having a specific three-dimensional shape is specified as 0.01 to 0.05, light scattering due to the structures on the surface of the film, microprojections, may be minimized to afford high light transmittance and low haze properties.

Commonly, when an anti-fingerprint film is realized by introducing a three-dimensional structure or increasing surface roughness, lowering of light transmittance and film haze increase are involved, and thus the film has a limitation in optical use. To the contrary, since the anti-fingerprint film according to one embodiment includes microprojections of the above-explained specific structure, it may have high repellency to organic components and simultaneously have high light transmittance, and a haze increase according to the three-dimensional structure may be minimized.

Specifically, the anti-fingerprint film of one embodiment may have a haze value of 6% or less, or 5% or less, compared to a flat film without microprojections at a thickness of 0.1 μm to 1000 μm. The thickness means the thickness of the total film of one embodiment also including the height of the microprojections.

Further, the anti-fingerprint film of one embodiment may have light transmittance of 85% or more, or 90% or more, to a light source A at a thickness of 0.1 μm to 1000 μm.

The internal radius of curvature (r) of the curved surface at which the side wall and the upper side are connected means a radius of the largest circle among circles that are drawn inside of the curved surface at which the side wall and the upper side are connected. One example of the internal radius of curvature (r) of the curved surface at which the side wall and the upper side are connected is as shown in FIG. 3 and FIG. 4.

The upper side that is connected to the side wall while forming a curved surface therewith is located on the upper part of the microprojection in a height direction, and constitutes a three-dimensional structure of the microprojection. The upper side may be a plane, and the whole or a part thereof may be a curved surface.

Meanwhile, the high transparency anti-fingerprint film may include two or more microprojections, wherein the ratio (D/P) of the longest diameter (D) of the upper side of one of the microprojections to the sum (P) of the distance between the upper sides of two neighboring microprojections and the longest diameter of the upper side of one of the microprojections may be 0.1 to 0.5, or 0.2 to 0.4. The width of one microprojection means the largest width of the microprojections in the direction of the contact side with the film.

According to another embodiment of the invention, a water repellent and oil repellent film including two or more linear micropatterns including a contact side with the film, the upper side facing therewith, and a side wall connecting the contact side and the upper side, and having such a three-dimensional shape that the internal angle formed by the side wall and the contact side with the film is an obtuse angle, is provided.

The inventors confirmed through experiments that the film, on the surface of which two or more linear micropatterns having the above specific three-dimensional structure are formed, may have a high contact angle to organic components as well as to water, thus realizing outstanding water repellency and oil repellency, and it may minimize the amount of transcribed contaminants and yet allow easy removal of transcribed contaminants, and completed the invention.

Particularly, as the micropatterns having a specific three-dimensional shape are linearly arranged on the film, mechanical properties such as higher durability and surface strength and the like may be secured compared to a film including microprojections of independent three-dimensional shapes (for example, a circular truncated cone, a truncated polypyramid, a reversed circular truncated cone, a reversed truncated polypyramid, and the like), and the film may maintain the shape of the micropattern and the resulting effects for a longer time.

The micropattern means a structure that is formed so as to protrude outside of the film and has a height or width of a nanometer or micrometer unit.

The linear micropattern means a linear pattern that is formed by connecting three-dimensional shapes formed so as to protrude outside of the film. As explained above, at least one linear micropattern may be formed on the film according to the one embodiment.

The height of the micropattern means the longest length in the protruded direction, and the width of the micropattern means the longest diameter in a direction perpendicular to the protruded direction. Further, even if the microprojections consist of a single material or two or more materials, or include a plurality of stacked structures, the height and the width of the microprojections may be defined as the height and the width of an external structure or shape that can be recognized as one structure or shape.

As explained above, the micropattern may have a contact side with the film, an upper side facing therewith, and a side wall connecting the contact side with the upper side, and may have such as a shape that the internal angle formed by the side wall and the contact side with the film is an obtuse angle. That is, the cross-sectional diameter of the micropattern may increase from the contact side with the film to the upper side.

The contact side with the film means a lower side at which the microprojection contacts the base side of the film. Further, the upper side means an upper side that is located at the uppermost part of the height direction of the microprojection, and faces the contact side. The side wall forms a side of the three-dimensional shape of the microprojection.

The distance between neighboring linear micropatterns may be 1 μm to 1000 μm, or 10 μm to 500 μm. As the distance between neighboring linear micropatterns is limited to the above range, a contact angle to organic components transcribed on the surface or moisture components may be more increased, the contact area of the above components may be reduced, and an air pocket may be more easily formed and maintained in a space defined by the micropattern and the base side of the film.

If the distance between neighboring linear micropatterns is too large, an air pocket that is formed in a space defined by the micropattern and the base side of the film may easily collapse. Further, if the distance between neighboring linear micropatterns is too small, it may be difficult for a space defined by the micropattern and the base side of the film to have a volume or shape appropriate for the formation of an air pocket.

The largest diameter of the upper part of the micropattern may be 0.1 μm to 100 μm, 1 μm to 50 μm, or 3 μm to 30 μm.

If the largest diameter of the upper part of the micropattern is too large, the ratio of the area occupied by the upper side of the micropattern on the surface of the film may become too large, or the area at which organic components or moisture components contact the film may become too broad, and thus the film may not simultaneously have the above-explained water repellency and oil repellency.

Further, if the largest diameter of the upper part of the micropattern is too small, mechanical durability of the micropattern may be remarkably degraded, it may be difficult to have a volume or shape appropriate for the formation of an air pocket, and the outer surface of the film may not be substantially different from a plane without microprojections due to the too small upper side of the micropattern, and thus the above-explained water repellency and oil repellency may not be simultaneously secured.

The film may include two or more linear micropatterns, and the ratio (D/P) of the longest diameter (D) of the upper side of one of the micropatterns to the sum (P) of the distance between the upper sides of the two neighboring micropatterns and the longest diameter of the upper side of one of the micropatterns may be 0.1 to 0.7 or 0.2 to 0.5.

As such, as the ratio of the longest diameter of the upper side of one micropattern to the distance between neighboring micropatterns is specified to the above range, a contact angle to organic components transcribed on the surface or moisture components may be more increased, the contact area of the above components may be reduced, and an air pocket may be more easily formed and maintained in a space defined by the micropattern and the base side of the film.

Further, lower interaction energy with organic components or water may be afforded to the water repellent and oil repellent film, thus minimizing the amount of transcribed organic components or moisture, and allowing easy removal of transcribed organic components.

If the ratio (D/P) is too small, for example the (P) is too large, an air pocket that is formed in a space defined by the micropattern and the base side of the film may easily collapse. Further, if the ratio (D/P) is too large, for example the (P) is too small, it may be difficult for a space defined by the micropattern and the base side of the film to have a volume or shape appropriate for the formation of an air pocket.

The height of the micropattern may be 0.1 μm to 40 μm, 1 μm to 20 μm, or 5 μm to 15 μm.

If the height of the micropattern is too small, it may be difficult for a space defined by the micropattern and the base side of the film to have a volume or shape appropriate for the formation of an air pocket, or a formed air pocket may easily collapse, and the outer surface of the film may have structural or surface characteristics that are not substantially different from a plane without microprojections, and thus the above-explained water repellency and oil repellency may not be simultaneously secured. Further, if the height of the micropattern is too large, mechanical hardness or physical properties of the film or micropattern itself may be degraded.

The internal angle formed by the side wall of the micropattern and the contact side of the film may be 100° to 170°, or 110° to 150°. Thereby, the width of the cross-section of the micropattern may gradually increase from the first width of the cross-section according to a certain angle or inclination.

As the base side of the film and the outer side wall of the micropattern form the above-explained internal angle, an air pocket may be more easily formed on the film, and higher repellency and high contact angle to organic components or liquid including water may be achieved.

The outside of the three-dimensional shape of the micropattern may be partially curved or inclined according to the preparation method. For example, the end of the upper side of the micropattern may have a rounded curve. As such, if the end of the upper side of the micropattern has a rounded curve, the distance between neighboring micropatterns may be defined as the shortest distance between the rounded curves of neighboring micropatterns.

The film of one embodiment may further include a fluorine-based compound layer stacked on the outer surface of the micropattern. The fluorine-based compound layer has high repellency to organic components transcribed on the film or moisture components and the like, and thus the collapse of an air pocket over time, by external pressure or gravity acting on a liquid, or by capillarity and the like, and the resulting penetration of these transcribed components inside the film may be prevented.

The fluorine-based compound layer may have a thickness of 5 nm to 5 μm, or 10 nm to 1 μm.

The fluorine-based compound layer may include a fluorine-based unimolecular compound, a fluorine-based polymer compound, or a mixture thereof.

The fluorine-based unimolecular compound may be a siloxane-based molecule including fluorine-substituted aliphatic, cycloaliphatic, or aromatic functional groups, or a perfluoropolyether-based compound, and the compound or molecule may include a functional group such as epoxy silane, methoxy silane, chlorosilane, and the like, which can be bonded to the microprojection or the surface of the film according to one embodiment, at the end.

The fluorine-based polymer compound may include a polymer or copolymer synthesized using reactive monomers including a fluorine-containing functional group.

Specifically, the fluorine-based polymer compound may include a (meth)acrylate-based polymer compound substituted by a fluorine-based functional group. The (meth)acrylate-based polymer compound substituted by a fluorine-based functional group may be obtained by polymerizing or copolymerizing a C1-12 perfluoroalkyl(meth)acrylate, pentafluorophenyl(meth)acrylate, or pentafluorobenzyl(meth) acrylate, or a mixture thereof.

Further, the fluorine-based polymer compound may include polytetrafluoroethylene, polytetrafluoroethylene oxide, polyhexafluoropropylene oxide, or a mixture thereof.

The fluorine-based compound layer may be formed on the outer surface of the micropattern through various coating methods or deposition methods, or it may be stacked on the base side of the film as well as on the micropattern.

For the formation or stacking of the fluorine-based compound layer, various coating methods or deposition methods may be used, and in order to form a fluorine-based compound layer having more uniform and appropriate thickness, thermal deposition, hot wire chemical vapor deposition (HW-CVD), or radical polymerization may be used.

If the hot wire chemical vapor deposition (HW-CVD) method is used, a fluorine-based compound layer having a uniform thickness over the whole area of the micropattern including a column part and a plate-shaped part may be formed.

Thus, the fluorine-based compound layer may be formed by stacking the fluorine-based polymer resin or a precursor thereof on the outside of the micropattern using the hot wire chemical vapor deposition method.

Meanwhile, the film of one embodiment may have a high contact angle to oleic acid or distilled water, for example, the film may have a static contact angle of 120° or more to 3 ul of distilled water, and a static contact angle of 100° or more to 3 ul of oleic acid.

Alternatively, the film may have a contact angle of 130° to 160° to 3 ul of distilled water, and a contact angle of 110° to 160° to 3 ul of oleic acid.

That is, the anti-fingerprint film may realize a Cassie-Baxter state both for organic components and moisture components, and it may simultaneously have outstanding water repellency and oil repellency.

In case a fingerprint or liquid is transcribed on the film of one embodiment, the microprojection and the base side of the anti-fingerprint film may form an air pocket in a space formed therein to afford high repellency and a high contact angle to the components included in the fingerprint or water.

Meanwhile, the micropattern may include at least one selected from the group consisting of glass, silicon, silicon doped with a metal, polysilicon, a silicon-based polymer, a metal, a urethane resin, a polyimide resin, a polyester resin, a (meth)acrylate-based polymer resin, a polyolefin resin, and a photosensitive polymer resin.

For example, the upper part of the micropattern may be formed using an etching mask on a substrate including components that can be used as the material of the micropattern, and thereafter, remaining material may be etched to form the micropattern.

Further, the micropattern may be formed by stacking a component making up the micropattern on a predetermined substrate, forming a pattern of a predetermined shape using an etching mask, and etching the remaining material.

In addition, the micropattern may be formed by coating a photosensitive resin composition on a predetermined substrate (for example, a silicon substrate, an organic substrate, a polymer substrate, and the like), exposing it to light, and alkali-developing it to form a specific pattern. For example, a microprojection in the shape of a reverse circular truncated cone having inclination on the side may be formed by coating a photosensitive resin composition on a predetermined substrate, and then using a photomask of a specific pattern, exposing it to light at the protruded direction of the microprojection or the rear direction thereof, and developing it.

According to yet another embodiment of the invention, a water repellent and oil repellent film including a continuous phase micropattern including a contact side with the film, the upper side facing therewith, and a side wall connecting the contact side and the upper side, and having such a three-dimensional shape that the internal angle formed by the side wall and the contact side with the film is an obtuse angle, is provided.

The inventors confirmed through experiments that the film, on the surface of which continuous micropatterns having the above specific three-dimensional structure are formed, may have a high contact angle to organic components as well as to water, thus realizing outstanding water repellency and oil repellency, and it may minimize the amount of transcribed contaminants and yet allow easy removal of transcribed contaminants, and completed the invention.

Particularly, as the micropatterns having a specific three-dimensional shape are located on the film in a continuous phase, mechanical properties such as higher durability and surface strength and the like may be secured compared to a film including microprojections of independent three-dimensional shapes (for example, a circular truncated cone, a truncated polypyramid, a reversed circular truncated cone, a reversed truncated polypyramid, and the like), and the film may maintain the shape of the micropattern and the resulting effects for a longer time.

The micropattern means a structure that is formed so as to protrude outside of the film, and has a height or width of a nanometer or micrometer unit.

The continuous phase micropattern means a pattern that is formed as one three-dimensional structure by connecting all three-dimensional shapes formed so as to protrude outside of the film.

The height of the micropattern means the longest length in the protruded direction, and the width of the micropattern means the longest diameter of the cross-section of the continuous phase micropattern in a direction perpendicular to the protruded direction. Further, even if the microprojections consist of single material or two or more materials, or include a plurality of stacked structures of structures, the height and the width of the microprojections may be defined as the height and the width of an external structure or shape that can be recognized as one structure or shape.

As explained above, the micropattern may have a contact side with the film, an upper side facing therewith, and a side wall connecting the contact side with the upper side, and may have such a shape that the internal angle formed by the side wall and the contact side with the film is an obtuse angle. That is, the diameter of the micropattern may increase from the contact side with the film to the upper side.

The contact side with the film means a lower side at which the micropattern contacts the base side of the film. Further, the upper side means an upper side that is located at the uppermost part of the height direction of the micropattern, and faces the contact side.

In case a recess defined by the side wall of the micropattern and the base side of the film is formed in the continuous phase micropattern as explained below, the upper side means a continued side of the upper part of the micropattern excluding an empty part formed due to the recess.

The side wall forms a side of the three-dimensional shape of the micropattern.

On the continuous phase micropattern, a recess defined by the side wall of the micropattern and the base side of the film may be formed.

The cross-section of the recess in the base side direction of the film may be a circle, an oval, or a polygon.

The longest diameter of the cross-section of the recess in the base side direction of the film may be 1 µm to 1000 µm, or 10 µm to 500 µm.

If the longest diameter of the cross-section of the recess in the base side direction of the film is too large, an air pocket that is formed in a space defined by the micropattern and the base side of the film may easily collapse. Further, if the longest diameter of the cross-section of the recess in the base side direction of the film is too small, it may be difficult for a space defined by the micropattern and the base side of the film to have a volume or shape appropriate for the formation of an air pocket.

The width of the continuous phase micropattern may be 0.1 µm to 100 µm, 1 µm to 50 µm, or 3 µm to 30 µm. The width of the continuous phase micropattern means the longest distance between the side walls filled by the micropattern.

If the width of the continuous phase micropattern is too large, the ratio of the area occupied by the upper side of the micropattern on the surface of the film may become too large, or the area at which organic components or moisture components contact the film may become too broad, the film may not simultaneously have the above-explained water repellency and oil repellency.

If the width of the continuous phase micropattern is too small, mechanical durability of the micropattern may be remarkably degraded, it may be difficult to have a volume or shape appropriate for the formation of an air pocket, and the outer surface of the film may not be substantially different from a plane without microprojections due to the excessively small upper side of the micropattern, and thus the above-explained water repellency and oil repellency may not be simultaneously secured.

The ratio (R2) of the width of the continuous phase micropattern to the cross-section of the recess in the base side direction of the film may be 0.1 to 0.7, or 0.2 to 0.5.

As such, as the ratio (R2) is specified to the above range, a contact angle to organic components or moisture components transcribed on the surface may be more increased, the contact area of these components may be reduced, and an air pocket may be easily formed and maintained in a space defined by the micropattern and the base side of the film.

Further, lower interaction energy with organic components or water may be afforded to the water repellent and oil repellent film, thus minimizing the amount of transcribed organic substance or moisture, and allowing easy removal of the transcribed organic substance.

If the ratio (R2) is too small, a space defined by the micropattern and the base side of the film may not be sufficient for the formation of an air pocket, a contact angle to organic components or moisture components transcribed on the surface may be decreased, or repellency to these components may be lowered. Further, if the ratio (R2) is too large, an air pocket that is formed in a space defined by the micropattern and the base side may easily collapse, and organic components or moisture components transcribed on the surface may easily penetrate into the substrate.

The height of the micropattern may be 0.1 µm to 40 µm, 1 µm to 20 µm, or 5 µm to 15 µm.

If the height of the micropattern is too small, it may be difficult for a space defined by the micropattern and the base side of the film to have a volume or shape appropriate for the formation of an air pocket, or a formed air pocket may easily collapsed, and the outer surface of the film may not be substantially different from a plane without microprojections, and thus the above-explained water repellency and oil repellency may not be simultaneously secured. Further, if the height of the micropattern is too large, mechanical hardness or physical properties of the film or micropattern itself may be degraded.

The internal angle formed by the side wall of the micropattern and the contact side with the film may be 100° to 170°, or 110° to 150°. Thereby, the width of the cross-section of the micropattern may gradually increase from the first width of the cross-section according to a certain angle or inclination.

As the base side of the film and the outer side wall of the micropattern form the above-explained internal angle, an air pocket may be more easily formed on the film, and higher repellency and a high contact angle to organic components or a liquid including water may be realized.

The outside of the three-dimensional shape of the micropattern may be partially curved or inclined according to the preparation method. For example, the upper side of the micropattern may have a rounded curve. As such, in case the end of the upper side of the micropattern has a rounded curve, the distance between neighboring micropatterns may be defined as the shortest distance between the rounded curves of neighboring micropatterns.

The film of one embodiment may further include a fluorine-based compound layer stacked on the outer surface of the micropattern. The fluorine-based compound layer has high repellency to organic components or moisture components and the like, which are transcribed on the film, and thus the collapse of an air pocket over time, or by external pressure or gravity acting on a liquid, or capillarity and the like, and the resulting penetration of these transcribed components inside the film, may be prevented.

The fluorine-based compound layer may have a thickness of 5 nm to 5 µm, or 10 nm to 1 µm.

The fluorine-based compound layer may include a fluorine-based unimolecular compound, a fluorine-based polymer compound, or a mixture thereof.

Specific components that can be included in the fluorine-based compound layer and the method of formation thereof include the above-explained contents in the above embodiment.

Meanwhile, the film according to one embodiment may have a high contact angle to oleic acid or distilled water, and for example, the film may have a static contact angle of 120° or more to 3 ul of distilled water and a static contact angle of 100° or more to 3 ul of oleic acid.

Alternatively, the film may have a contact angle of 130° to 160° to 3 ul of distilled water, and may have a contact angle of 110° to 160° to 3 ul of oleic acid. That is, the anti-fingerprint film may realize a Cassie-Baxter state both for organic components and moisture components, and may simultaneously have outstanding water repellency and oil repellency.

If a fingerprint or liquid is transcribed on the film, the microprojection and the base side of the anti-fingerprint film may form an air pocket in a predetermined space formed therein, to afford high repellency and a high contact angle to the components included in the fingerprint or water.

Meanwhile, the microprojection may include at least one selected from the group consisting of glass, silicon, silicon doped with a metal, polysilicon, a silicon-based polymer, a metal, a urethane resin, a polyimide resin, a polyester resin, a (meth)acrylate-based polymer resin, a polyolefin resin, and a photosensitive polymer resin.

For example, the upper part of the micropattern may be formed on a substrate including components that can be used as the material of the micropattern using an etching mask, and thereafter, remaining material may be etched to form the micropattern.

Further, the above-explained micropattern may be formed by stacking a component making up the micropattern on a predetermined substrate, forming a pattern of a predetermined shape using an etching mask, and etching remaining material.

In addition, the microprojection may be formed by coating a photosensitive resin composition on a predetermined substrate (for example, a silicon substrate, an organic substrate, a polymer substrate, and the like), exposing it to light, and alkali-developing it to form a specific pattern. For example, a microprojection in the shape of a reverse circular truncated cone having inclination on the side may be formed by coating a photosensitive resin composition on a predetermined substrate, and then using a photomask of a specific pattern, exposing it to light at the protruded direction of the microprojection or the rear direction thereof, and developing it.

According to yet another embodiment, an electrical and electronic apparatus including the above-explained anti-fingerprint film is provided.

The details of the anti-fingerprint film and the microprojections formed on the film are as explained above.

The film may have a contact angle of 120° or more, or a contact angle of 130° to 160° to 3 μl of oleic acid.

Further, the film may have a contact angle of 120° or more, or a contact angle of 130° to 160° to 3 μl of distilled water.

While the film has an extremely high contact angle and high repellency to organic components or moisture components, the contact area of these components is extremely small. The film may realize a Cassie-Baxter state both for organic components and moisture components.

The electrical and electronic apparatus includes various electrical devices, display devices, semiconductor devices, home appliances, and the like.

Examples of the electrical and electronic apparatus may include display devices such as a TV, a computer monitor, a liquid crystal device for a cellular phone, various display devices such a LCD, LED, or OLED devices and the like; electrical devices such as an integrated circuit device consisting of a diode, a transistor, and the like, a thermal electron emission device, a charge coupled device of an electronic camera, a solar cell, or a light emitting device, and the like; and home appliances such as a refrigerator, an air conditioner, a washing machine, a dishwasher, a rice cooker, an oven, and the like.

The anti-fingerprint film may be formed or bonded on at least one side of the inside or outside of the electrical and electronic apparatus. Particularly, the anti-fingerprint film may be formed on the surface of the screen of the display device.

Advantageous Effect of the Invention

According to the present invention, an anti-fingerprint film that may minimize transcription of a fingerprint on the product surface and yet may allow easy removal of a transcribed fingerprint, and simultaneously realize outstanding water repellency and oil repellency, and a display device including the anti-fingerprint film are provided.

Further, the anti-fingerprint film may minimize the amount of contaminants transcribed on the product surface, allow easy removal of a transcribed contaminant, and have high light transmittance, low haze, and anti-fingerprint properties.

The display device including the anti-fingerprint film may prevent degradation of image quality due to transcription of a fingerprint or contaminant, and allow easy removal of a transcribed fingerprint or contaminant, and thus has excellent anti-contamination and high image quality realization.

DETAILED DESCRIPTION OF THE EMBODIMENTS

The present invention will be explained in detail with reference to the following examples. However, these examples are only to illustrate the invention, and the scope of the invention is not limited thereto.

Example: Preparation of Anti-Fingerprint Film

Example 1

(1) Formation of Microprojection

On an organic substrate, Cr was deposited to a thickness of about 200 nm using a sputterer. A negative photoresist was coated on the deposited Cr layer, and using a photomask, UV was irradiated so as to form a reversed image of a 6 μm diameter circular pattern. Further, the uncured area was removed using photoresist stripper [the photomask was prepared].

Thereafter, a negative photoresist was coated on the Cr layer on which the circular pattern was formed to a thickness of 7 μm, and using index matching liquid and a diffuser, it was exposed to UV to form a photoresist (PR) including microprojections of the shape of a reversed circular truncated cone or reversed truncated polypyramid.

The photoresist (PR) including microprojections was surface-treated with fluorine, and then a mold was prepared using polydimethylsiloxane. Further, the mold was surface-treated with fluorine, and then polydimethylsiloxane was injected into the mold to prepare a film including microprojections.

(2) Formation of Fluorine-Based Compound Layer

The anti-fingerprint film was treated with oxygen plasma, and thermally evaporated at a temperature of 400° C. and an evaporation speed of 2 Å/s under a vacuum condition of $2*10^{-6}$ torr to form a perfluoropolyether (PFPE) fluorine-based compound layer with a thickness of 20 nm.

Figure 1:
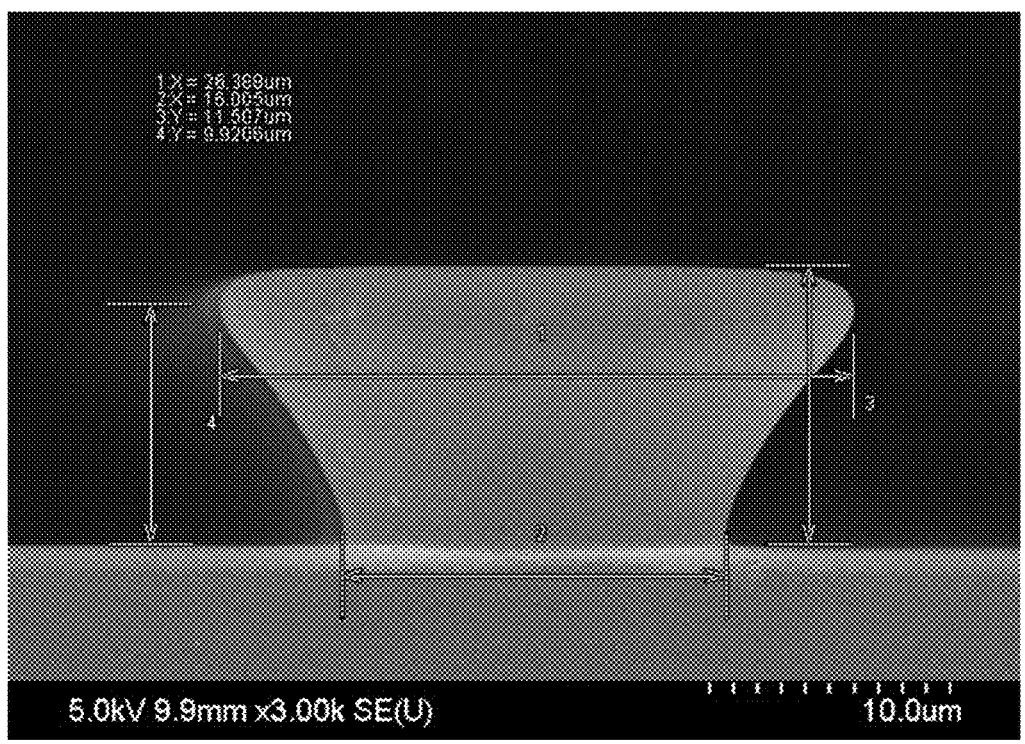
FIG. 1 shows a side SEM photograph of the microprojection of the anti-fingerprint film of Example 1.
Figure 2:
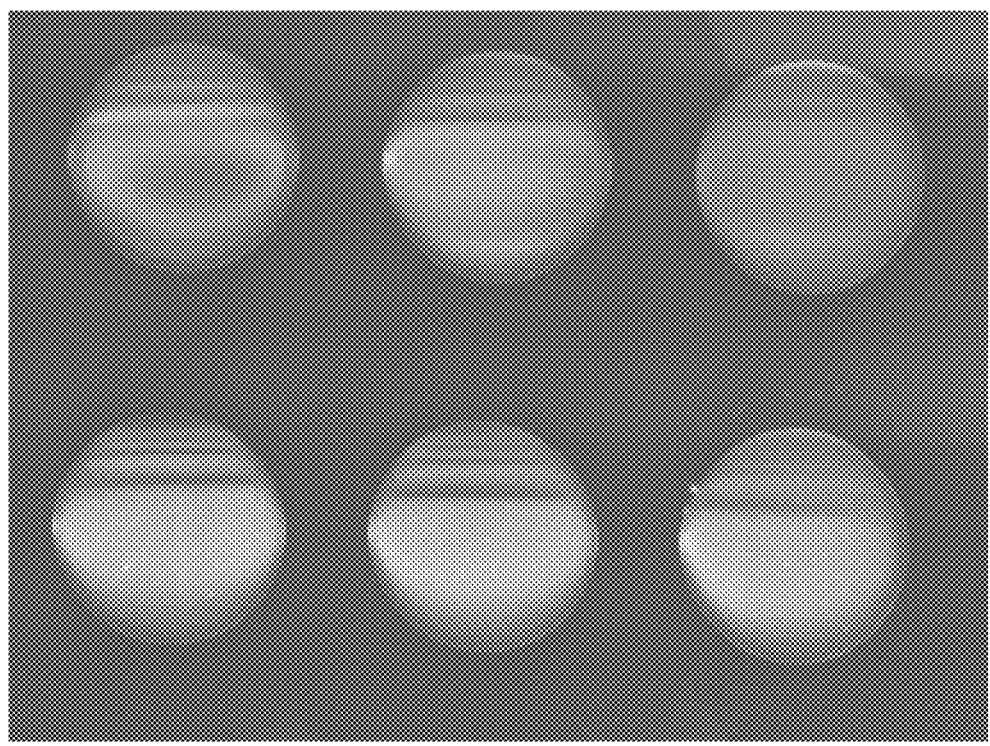
FIG. 2 shows a planar SEM photograph of the anti-fingerprint film of Example 1.

The side view and planar view of the film including microprojections are respectively shown in FIG. 1 and FIG. 2.

Example 2

(1) Formation of Microprojection

On a silicon wafer, a $SiO_2$ layer was formed by PE-CVD (Plasma-enhanced chemical vapor deposition) to a thickness of 500 nm. A negative photoresist was coated on the $SiO_2$ layer, and using a photomask, UV was irradiated so as to form a pattern of a plate-shaped part with a diameter of 15 μm. Further, using a photoresist stripper, parts other than the pattern of a plate-shaped part (functioning as an etching mask) were removed.

Thereafter, the $SiO_2$ layer was etched using BOE (buffered oxide etchant) to form a plate-shaped part of the microprojection [thickness: 0.3 μm] that is also realized by the pattern of a plate-shaped part, and silicon was etched using a potassium hydroxide solution (etching a silicon wafer) to form a column part with a 3 μm height pattern.

Figure 3:
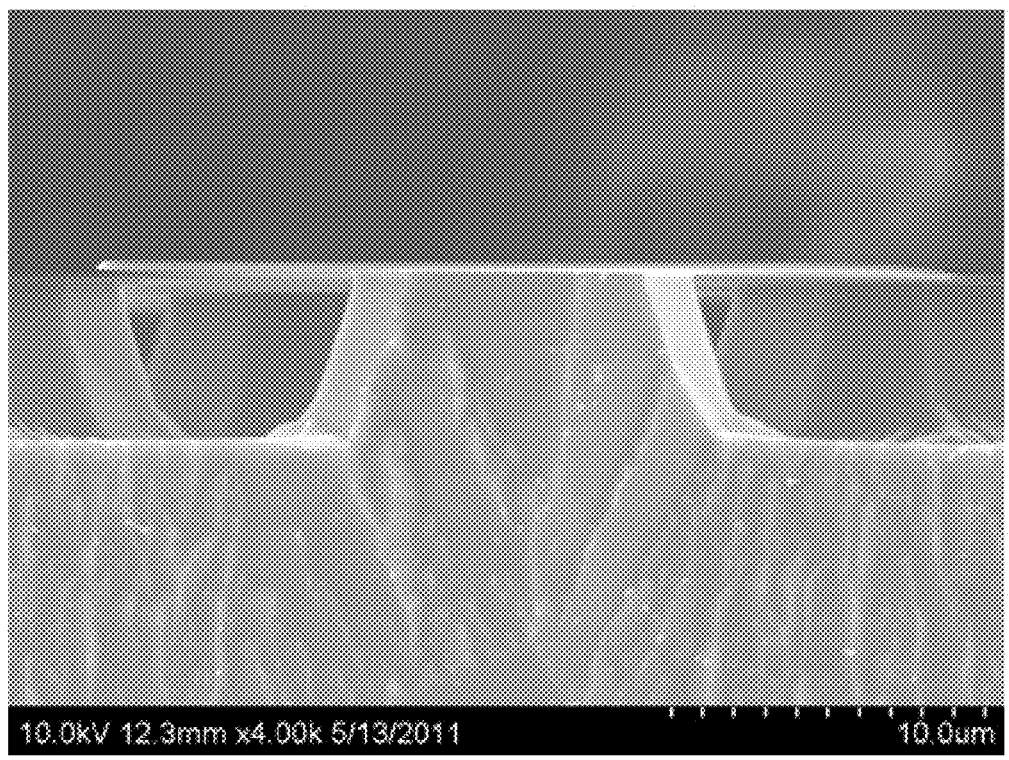
FIG. 3 shows a cross-sectional SEM photograph of the microprojection of the anti-fingerprint film of Example 2.
Figure 4:
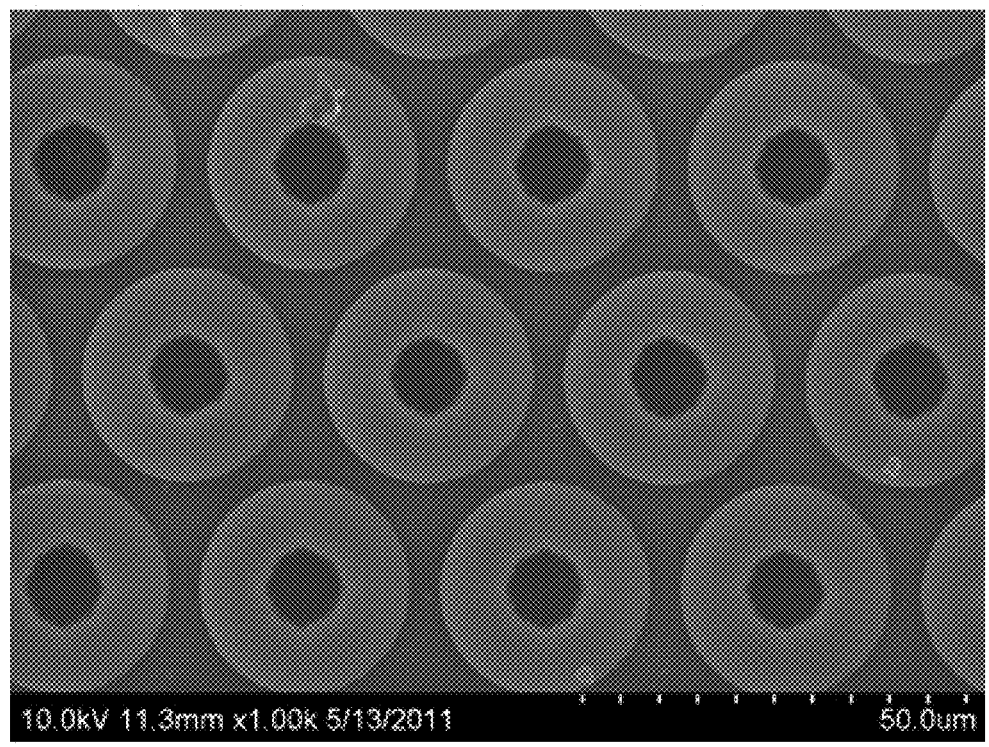
FIG. 4 shows a 45° side SEM photograph of the anti-fingerprint film of Example 2.

A cross-sectional view and a planar view of the film including microprojections including a plate-shaped part and a column part are respectively shown in FIG. 3 and FIG. 4.

(2) Formation of Fluorine-Based Compound Layer

On the surface of the film including microprojections including a plate-shaped part and a column part, fluoroctatrichlorosilane (FOTS) was stacked by vapor deposition, and heat-treated in an oven at 100° C. for 30 minutes. After the heat treatment, non-deposited remaining FOTS was removed using n-hexene to obtain a film, on the surface of which a fluorine-based compound layer was stacked.

Example 3

(1) Formation of Microprojection

On an organic substrate, Cr was deposited to a thickness of about 200 nm using a sputterer. A negative photoresist was coated on the deposited Cr layer, and using a photomask, UV was irradiated so as to form a reversed image of a 6 μm diameter circular pattern. Further, the uncured area was removed using a photoresist stripper [The photomask was prepared].

Thereafter, a negative photoresist was coated on the Cr layer on which the circular pattern was formed to a thickness of 7 μm, and using index matching liquid and a diffuser, it was exposed to UV to form a photoresist (PR) including microprojections of the shape of a reversed circular truncated cone or reversed truncated polypyramid.

The photoresist (PR) including microprojections was surface-treated with fluorine, and then a mold was prepared using polydimethylsiloxane. Further, the mold was surface-treated with fluorine, and then polyurethane acrylate resin was injected into the mold and UV cured to prepare a film including microprojections.

Figure 5:
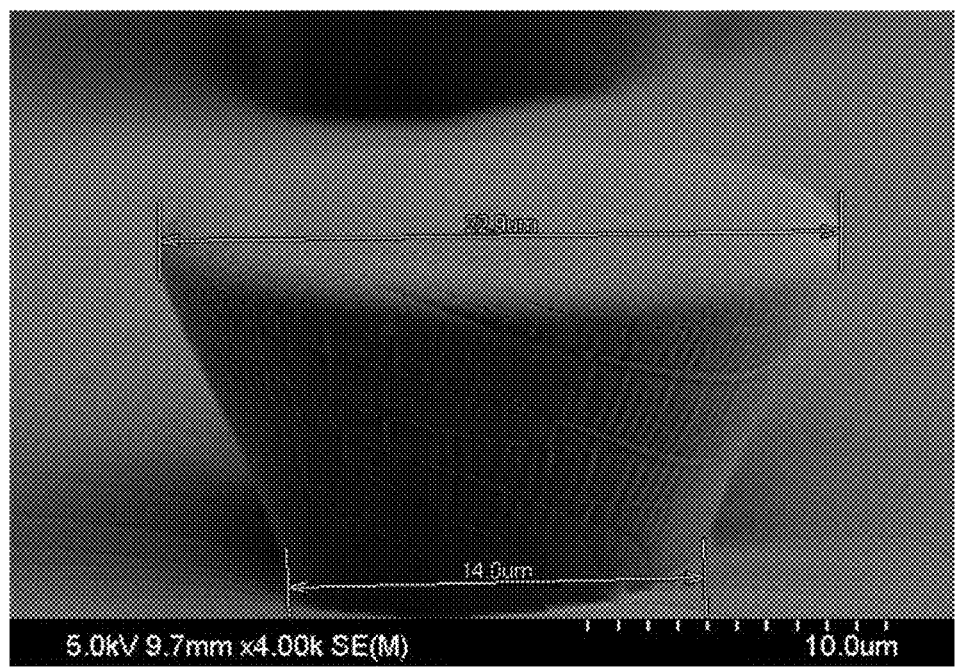
FIG. 5 shows a side SEM photograph of the microprojection of the anti-fingerprint film of Example 3.
Figure 6:
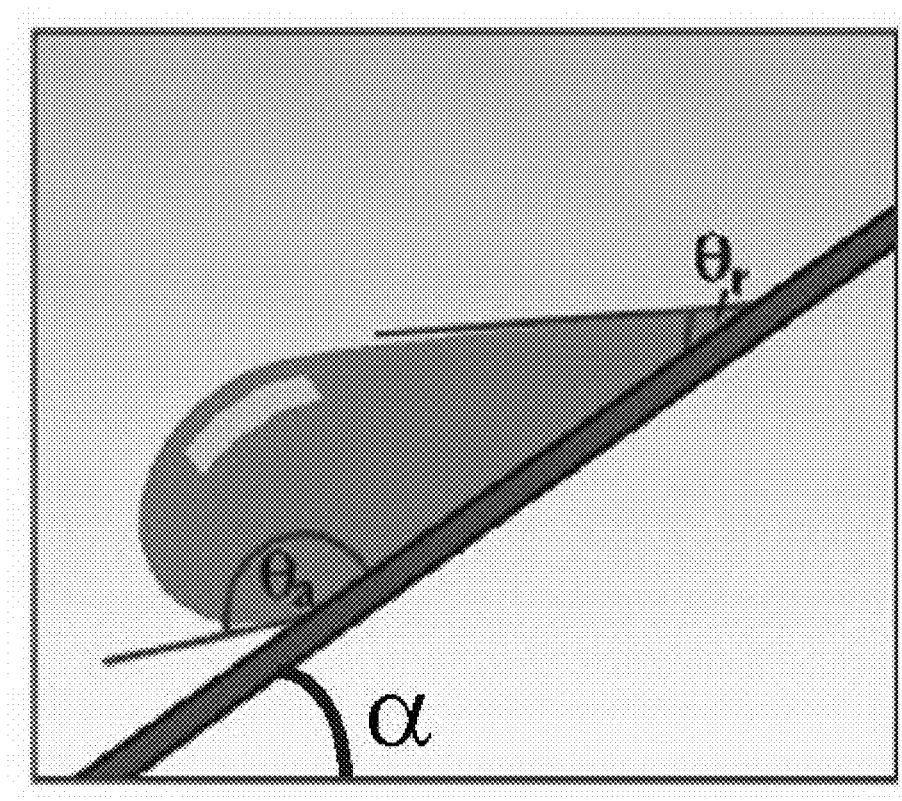
FIG. 6 shows a sliding angle of liquid put on a substrate, a contact angle (θa) formed by the substrate and the surface of the front end direction of the liquid, and a contact angle (θr) formed by the substrate and the surface of the back end of the liquid, at the sliding angle.

A surface SEM photograph of the film including microprojections is shown in FIG. 5.

Comparative Examples 1 and 2: Preparation of Film

Comparative Example 1

Polytetrafluroethylene (PTFE) was deposited on a glass substrate by hot wire chemical vapor deposition (HW-CVD) at a hot wire temperature of 650° C., a pressure of 1 torr, and hexafluoropropylene oxide (HFPO) at 50 sccm.

Comparative Example 2

A glass substrate was treated with oxygen plasma, and then, thermally evaporated at a temperature of 400° C. and a deposition speed of 2 Å/s, under a vacuum condition of $2*10^{-6}$ torr, to form a perfluoropolyether (PFPE) layer on the anti-fingerprint film to a thickness of 20 nm.

Experimental Example 1: Measurement of Static Contact Angle, Dynamic Contact Angle, and Interaction Energy The static contact angles and the dynamic contact angles of the surface of the films obtained in examples and comparative examples to oleic acid were measured, and interaction energies were calculated based on the measurement results.

(1) Measurement of Static Contact Angle

By a tangent method, each 3 μl of water and oleic acid were put on the films obtained in examples and comparative examples, and the static contact angles were measured using a DSA 100 measuring apparatus.

(2) Measurement of Dynamic Contact Angle

30 μl of oleic acid was put on the films obtained in examples and comparative examples, and then, while one side of the film was raised to form an inclination, an angle at which the oleic acid slides down (sliding angle), a contact angle formed by the film and the surface of the front direction of oleic acid at the sliding angle (advancing angle), and a contact angle formed by the film and the surface of the back end direction of the liquid at the sliding angle (receding angle) were measured by a tilting table method using a DSA 100 measuring apparatus.

(3) Measurement of Interaction Energy ($K_A$)

1) In Example 1, the interaction energy of the anti-fingerprint film was determined by the following General Formula 1.

$$K_A = \left[\left\{\frac{\rho(2 - 3\cos\theta' + \cos^3\theta')}{3}\right\}^{1/3}\right] \frac{g}{2} \frac{(1 + \cos\theta')}{(1 + \cos\theta)} \left(\frac{m}{\pi}\right)^{2/3} \frac{\sin\alpha}{\sin\theta'}$$ [General Formula 1]

In the General Formula 1, $\alpha$ is a sliding angle of oleic acid put on the film of Example 1, $\theta'$ is a static contact angle of oleic acid put on the film of Example 1, $\theta$ is a static contact angle of oleic acid on a planar film, $\rho$ is the density of oleic acid, m is the weight of oleic acid, and g is gravitational acceleration.

2) The interaction energies of the films of Comparative Examples 1 and 2 were determined by the following General Formula 2.

$$K_A = \left[\left\{\frac{\rho(2 - 3\cos\theta + \cos^3\theta)}{3}\right\}^{1/3}\right] \frac{g}{2} \left(\frac{m}{\pi}\right)^{2/3} \frac{\sin\alpha}{\sin\theta}$$ [General Formula 2]

In the General Formula 2, $\alpha$ is a sliding angle of oleic acid on the film, $\theta$ is a static contact angle, $\rho$ is the density of oleic acid, m is the weight of oleic acid, and g is gravitational acceleration.

The measurement results are shown in the following Table 1.

TABLE 1

|  | Static contact angle to water [°] | Static contact angle to oleic acid ($\theta'$) [°] | Hysteresis to oleic acid [°] | Sliding angle to oleic acid [°] | Interaction energy with oleic acid ($K_A$) [mJ/m²] |
|---|---|---|---|---|---|
| Example 1 | 142 | 144 | 47.8 | 14.4 | 1.4 |
| Comparative Example 1 | 113 | 83.5 | 84.2 | 38 | 10 |
| Comparative Example 2 | 118 | 77.4 | 36.5 | 16.5 | 4.4 |

The $\theta'$ and $\theta$ are as defined in the General Formula 1 and General Formula 2.
Hysteresis means a differential value between a contact angle (θa) formed by the substrate and the surface of the front end direction of the liquid and a contact angle (θr) formed by the substrate and the surface of the back end direction of the liquid at a sliding angle of liquid put on a substrate.

As shown in the Table 1, the film of Example 1 has large static contact angles to water and oleic acid, and relatively small sliding angle and interaction energy to oleic acid, compared to the films of Comparative Examples 1 and 2.

That is, it was confirmed that the film of Example 1 may have an extremely high contact angle and high repellency to organic components and moisture components, and that in case organic components included in the fingerprint or moisture components are transcribed on the surface, the contact areas are also very small.

(4) Measurement Result of Anti-Fingerprinting Property

Example 1-1

The anti-fingerprint film prepared by the method of Example 1 was stacked on a 0.5 mm LCD glass, transmittance and haze were measured, and the results are shown in the following Table 2.

The transmittance and haze were measured on a light source A using an HM150 apparatus.

TABLE 2

Measurement results of transmittance and Haze in Example 1-1

| Top D | Tt [%] | Haze [%] | D/P |
|---|---|---|---|
| Height of microprojection of 7 um | | | |
| 24.5 | 84.9 | 3.9 | 0.47 |
| 24.5 | 89.6 | 1.7 | 0.34 |
| 24.5 | 91.6 | 1.4 | 0.28 |
| 21 | 86.8 | 3.9 | 0.39 |
| 21 | 90 | 1.8 | 0.29 |
| 21 | 91.2 | 1.2 | 0.24 |
| 20 | 84.3 | 5.2 | 0.5 |
| 20 | 90.4 | 1.5 | 0.29 |
| 20 | 92.2 | 0.9 | 0.2 |
| 20 | 87.8 | 2.3 | 0.37 |
| 20 | 90.5 | 1.3 | 0.28 |
| 20 | 92.3 | 1.1 | 0.23 |
| 19 | 82.3 | 6 | 0.48 |
| 19 | 90 | 1.9 | 0.27 |
| 19 | 92.2 | 1.2 | 0.19 |
| 19 | 88.5 | 2.6 | 0.35 |
| 19 | 90.9 | 1.4 | 0.26 |
| 19 | 91.8 | 1.1 | 0.22 |
| 16 | 85.7 | 4 | 0.38 |
| 16 | 89.8 | 2.1 | 0.27 |
| 16 | 73.3 | 11.5 | 0.67 |
| 16 | 86.5 | 3.1 | 0.38 |
| 16 | 89.9 | 1.6 | 0.27 |
| Height of microprojection of 12 um | | | |
| 24 | 75.7 | 10.2 | 0.61 |
| 24 | 88 | 2.2 | 0.35 |
| 24 | 91.5 | 1.6 | 0.24 |
| 22 | 82.3 | 8.6 | 0.56 |
| 22 | 90.6 | 2.5 | 0.32 |
| 17 | 85.8 | 5.9 | 0.4 |
| 17 | 91.8 | 3.6 | 0.28 |

Top D is the longest diameter of the cross-section of the uppermost part of the microprojection in the base side direction.
Tt is transmittance
D/P is the ratio of the longest diameter (D) of the upper side of one of the microprojections to the sum (P) of the distance between two neighboring microprojections and the longest diameter of the upper side of one of the microprojections.

Example 1-2

The anti-fingerprint film prepared by the method of Example 1 was stacked on a 0.5 mm LCD glass, transmittance and haze were measured, and the results are shown in the following Table 3. The transmittance and haze were measured on a light source A using an HM150 apparatus.

TABLE 3

Measurement results of transmittance and Haze in Example 1-2

| Height of microprojection | | 7 μm | | | | | | | | |
|---|---|---|---|---|---|---|---|---|---|---|
| Top D | | 20 | 20 | 19 | 19 | 19 | 19 | 19 | 19 | 16 | 16 |
| D/P | | 0.37 | 0.28 | 0.48 | 0.27 | 0.19 | 0.35 | 0.26 | 0.22 | 0.38 | 0.27 |
| Before transcription | Reference example | 0.1 | 0.1 | 0.2 | 0.2 | 0.2 | 0.2 | 0.2 | 0.2 | 0.2 | 0.2 |
| | Example | 2.5 | 1.5 | 5.7 | 1.9 | 1.5 | 3 | 1.8 | 1.4 | 3.3 | 1.8 |
| After transcription | Reference example | 8.5 | 4.5 | 8.7 | 11.4 | 8.5 | 5.3 | 7.2 | 4.7 | 12 | 9.8 |
| | Example | 3.1 | 2.2 | 7.3 | 4.8 | 7.2 | 3.9 | 4.6 | 3.5 | 5.2 | 8.6 |
| Δ | Reference example | 8.4 | 4.4 | 8.5 | 11.2 | 8.3 | 5.1 | 7 | 4.5 | 11.8 | 9.6 |
| | Example | 0.6 | 0.7 | 1.6 | 2.9 | 5.7 | 0.9 | 2.8 | 2.1 | 1.9 | 6.8 |
| Transcription ratio (%) | | 7 | 16 | 19 | 26 | 69 | 18 | 40 | 47 | 16 | 71 |

Top D: the longest diameter of the uppermost part of the microprojection in the base side direction
D/P: the ratio of the longest diameter (D) of the upper side of one of the microprojections to the sum (P) of the distance between two neighboring microprojections and the longest diameter of the upper side of one of the microprojections.
Δ: differential value between the transcribed amounts before and after transcription
transcription ratio: the ratio of Δ of the example to Δ of the reference example
The film of the reference example was prepared by thermally evaporation at a temperature of 400° C. and a deposition speed of 2 Å/s under a vacuum condition of 2 * 10$^{-6}$ torr, to form a perfluoropolyether (PFPE) layer with a thickness of 20 nm on an organic substrate.

As confirmed in the Table 3, the anti-fingerprint film of the example did not have a significant change in haze value before and after transcription of a fingerprint, and thus it was confirmed that the transcribed amount of the fingerprint is not large. To the contrary, it was confirmed that in the case of the film of the reference example, the haze value significantly increased after transcription of a fingerprint.

Specifically, the transcribed amount of fingerprint in the example was a minimum of 7% to a maximum of 71%, based on the reference example, and thus it was confirmed that the anti-fingerprint film of the example may largely reduce transcription of a fingerprint on the product surface.

Examples 4 and 5: Preparation of High Transparency Anti-Fingerprint Film

Example 4

(1) Formation of Microprojection

On an organic substrate, Cr was deposited to a thickness of about 200 nm using a sputterer. A negative photoresist was coated on the deposited Cr layer, and using a photomask, UV was irradiated so as to form a reversed image of a 6 μm diameter circular pattern. Further, the uncured area was removed using a photoresist stripper [the photomask was prepared].

Thereafter, a negative photoresist was coated on the Cr layer on which the circular pattern was formed to a thickness of 7 μm, and using index matching liquid and a diffuser, it was exposed to UV to form a photoresist (PR) including microprojections of the shape of a reversed circular truncated cone or reversed truncated polypyramid.

The photoresist (PR) including microprojections was surface-treated with fluorine, and then a mold was prepared using polydimethylsiloxane. Further, the mold was surface-treated with fluorine, and then polydimethylsiloxane was injected into the mold to prepare a film including microprojections.

(2) Formation of Fluorine-Based Compound Layer

Perfluoropolyether (PFPE) was deposited on the surface of the above-obtained film to a thickness of about 20 nm, by thermal evaporation at a temperature of 400° C., a deposition speed of 2 Å/s, under a vacuum condition of 2*10$^{-6}$ torr to form a fluorine-based compound layer.

Example 5

The high transparency low haze anti-fingerprint film prepared by the same method of Example 1 was stacked on a 0.5 mm LCD glass, transmittance and haze were measured, and the results are shown in the following Table 4.

Herein, the upper diameter, height, and D/P ratio of the microprojections formed on the high transparency anti-fingerprint film were maintained at the same levels, and UV exposure was set 12,000 mJ so that the ratio (r/D) of the internal radius of curvature (r) of the curved surface at which the side wall and the upper side are connected to the width (D) of the microprojection may become 0.07.

Figure 7:
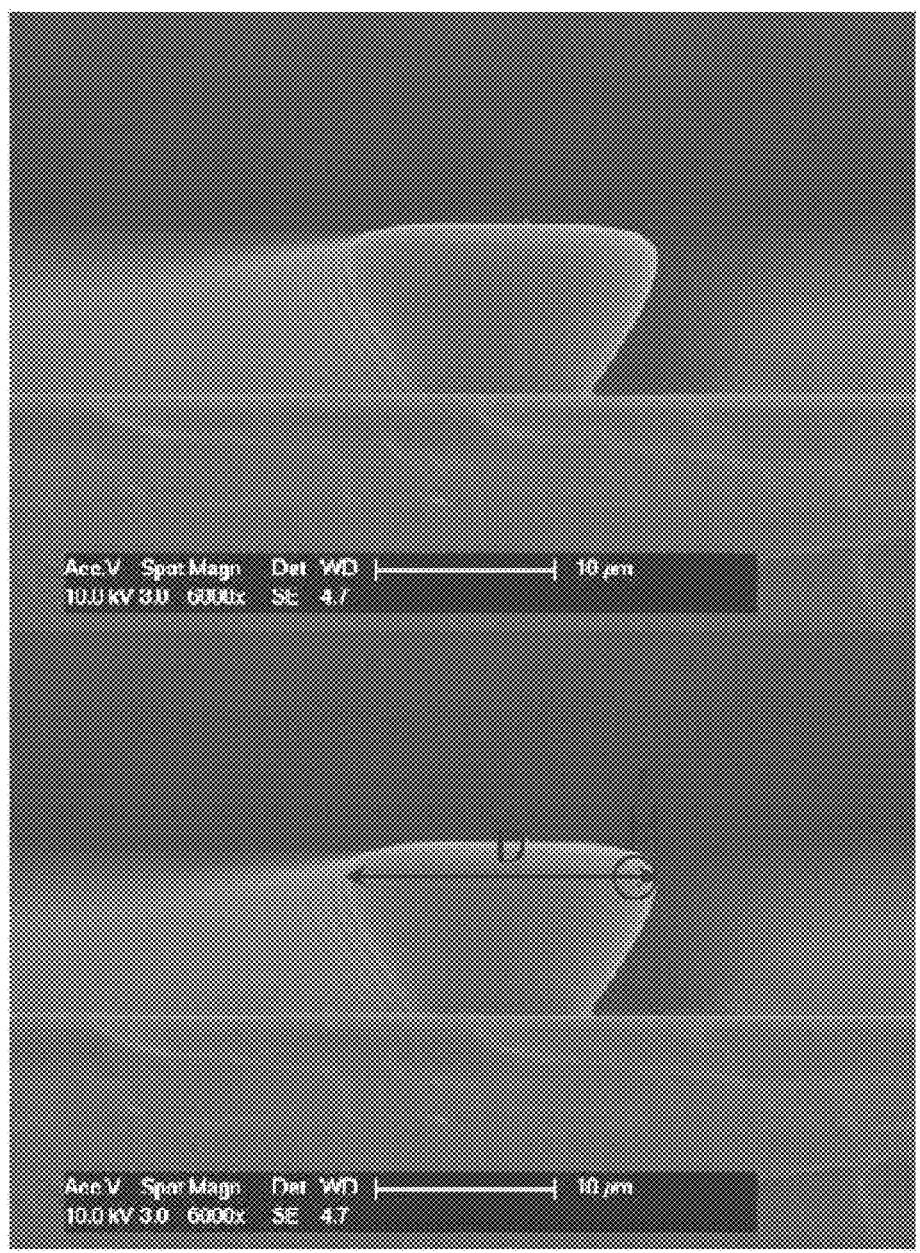
FIG. 7 shows a side SEM photograph of the microprojection of the anti-fingerprint film having high transparency and low haze properties of Example 5.

The side view of the film including microprojections is shown in FIG. 7.

The transmittance and haze were measured on a light source A using an HM150 apparatus.

Example 6

The high transparency low haze anti-fingerprint film prepared by the same method of Example 1 was stacked on a 0.5 mm LCD glass, transmittance and haze were measured, and the results are shown in the following Table 4.

Herein, the upper diameter, height, and D/P ratio of the microprojections formed on the high transparency anti-fingerprint film were maintained at the same levels, and UV exposure was set 11,000 mJ so that the ratio (r/D) of the internal radius of curvature (r) of the curved surface at which the side wall and the upper side are connected to the width (D) of the microprojection may become 0.1.

The transmittance and haze were measured on a light source A using an HM150 apparatus.

TABLE 4

|  | Top D | Height of microprojection | D/P | r/D | Tt (%) | Haze (%) | ΔHaze (%) |
|---|---|---|---|---|---|---|---|
| Example 5 | 17 | 12 | 0.4 | 0.07 | 85.8 | 5.9 | 5.4 |
| Example 6 | 17 | 12 | 0.4 | 0.1 | 90.3 | 7.8 | 7.3 |

In case a film is stacked on a 0.5 mm LCD glass to the same thickness as Example 1 and Comparative Example 1, Tt and Haze value are respectively 92.1% and 0.5%.
Top D is the longest diameter of the cross-section of the uppermost part of the microprojection in the base side direction.
Tt is transmittance
D/P is the ratio of the longest diameter (D) of the upper side of one of the microprojections to the sum (P) of the distance between two neighboring microprojections and the longest diameter of the upper side of one of the microprojections.
r/D is the ratio of the internal radius of curvature (r) of the curved surface at which the side wall and the upper side are connected to the width (D) of the microprojection.
ΔHaze (%) is the differential value from the haze value of a flat film of the same thickness/material as the film of the example.

As shown in the Table 4, it was confirmed that in Examples 5 and 6, haze increase is low due to the structure of the anti-fingerprint film.

Example 7

The high transparency anti-fingerprint film prepared by the same method of Example 2 was stacked on a 0.5 mm LCD glass, transmittance and haze were measured, and the results are shown in the following Table 5. The transmittance and haze were measured on a light source A using an HM150 apparatus.

TABLE 5

| Measurement results of transmittance and haze in Example 7 | | |
|---|---|---|
| Height of microprojection | | 11 μm |
| Top D | | 17 |
| D/P | | 0.4 |
| Before transcription | Reference Example | 0.1 |
|  | Example | 5.9 |
| After transcription | Reference Example | 9.5 |
|  | Example | 8.0 |
| Δ | Reference Example | 9.4 |
|  | Example | 2.1 |
| Transcription ratio (%) | | 22 |

Top D: the longest diameter of the uppermost part of the microprojection in the base side direction
D/P: the ratio of the longest diameter (D) of the upper side of one of the microprojections to the sum (P) of the distance between two neighboring microprojections and the longest diameter of the upper side of one of the microprojections
Δ: differential value between the transcribed amounts before and after transcription
transcription ratio: the ratio of Δ of the example to Δ of the reference example
The film of the reference example was prepared by thermally evaporating at a temperature of 400° C. and a deposition speed of 2 Å/s under a vacuum condition of 2 * 10$^{-6}$ torr, to form a perfluoropolyether (PFPE) layer with a thickness of 20 nm on an organic substrate.

As confirmed in Table 5, the high transparency low haze anti-fingerprint film of Example 7 did not show a significant change in haze value before and after transcription of a fingerprint, and thus it was confirmed that the transcribed amount of fingerprint is not large.

Examples 8 to 11: Preparation of Film

Example 8

(1) Formation of Microprojection
On an organic substrate, Cr was deposited to a thickness of about 200 nm using a sputterer. A negative photoresist was coated on the deposited Cr layer, and using a photomask, UV was irradiated so as to form a reversed image of a 21 μm width linear pattern. Further, the uncured area was removed using a photoresist stripper [the photomask was prepared].

Thereafter, a negative photoresist was coated on the Cr layer on which the pattern was formed to a thickness of 7 μm, and using index matching liquid and a diffuser, it was exposed to UV to form a photoresist (PR) including microprojections of the shape of a reversed circular truncated cone or reversed truncated polypyramid.

The photoresist (PR) including microprojections was surface-treated with fluorine, and then a mold was prepared using polydimethylsiloxane. Further, the mold was surface-treated with fluorine, and then polydimethylsiloxane was injected into the mold to prepare a film including microprojections.

(2) Formation of Fluorine-Based Compound Layer
A perfluoropolyether (PFPE) layer was deposited on the surface of the above obtained film to a thickness of about 20 nm by thermal evaporation at a temperature of 400° C. and an evaporation speed of 2 Å/s under a vacuum condition of 2*10$^{-6}$ torr to form a fluorine-based compound layer.

Figure 8:
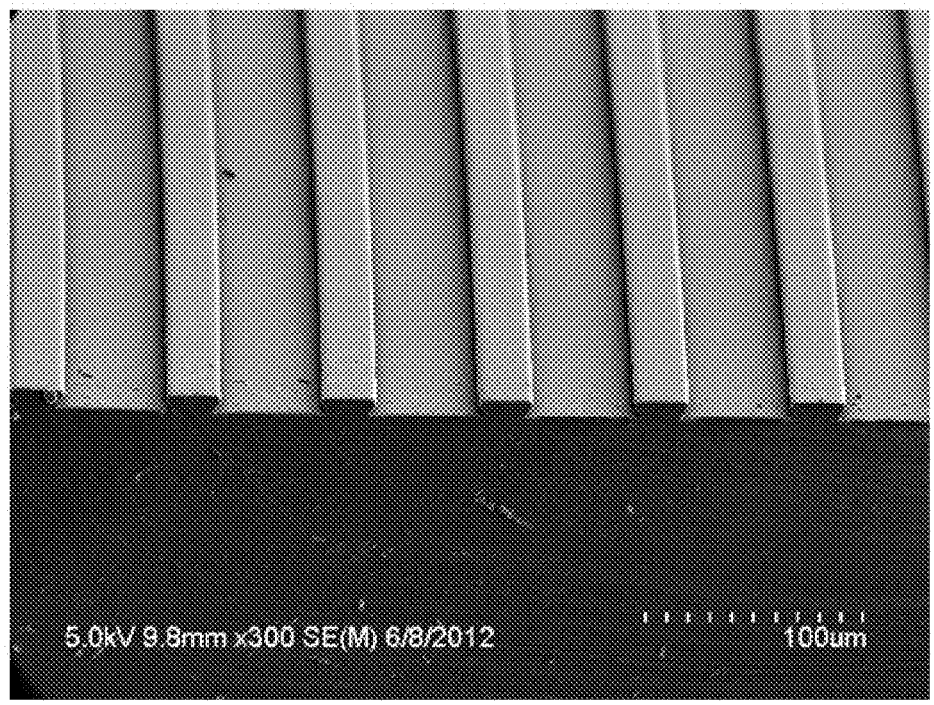
FIG. 8 respectively shows the cross-section of the film, and the SEM photograph of the plane when the film is viewed from the top, in Example 8.
Figure 8:
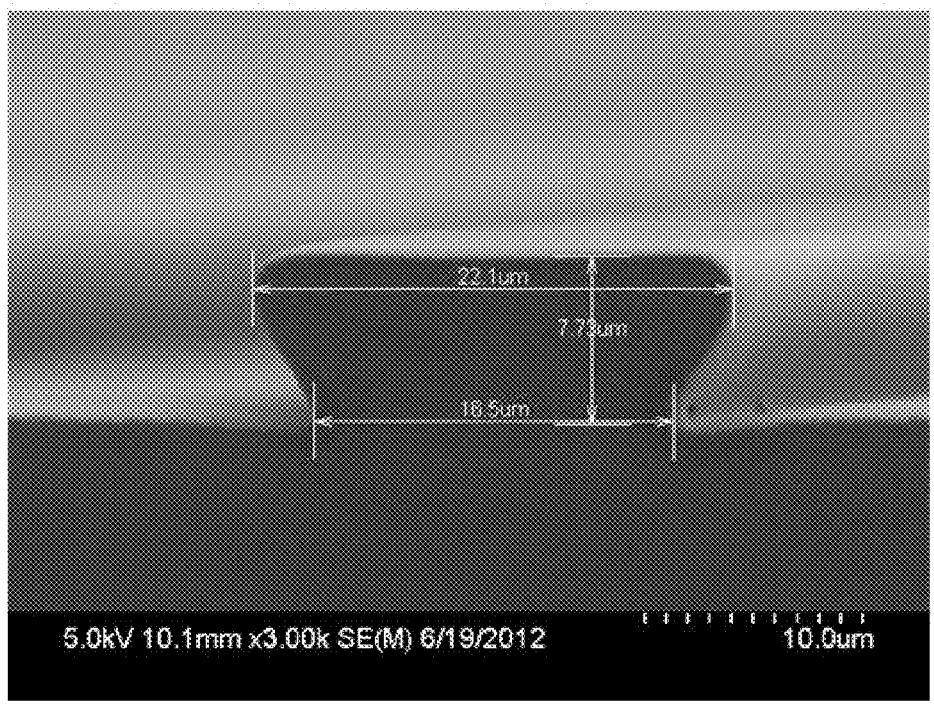

The cross-sectional view and the planar view of the film including a linear micropattern are shown in FIG. 8.

Example 9

(1) Formation of Microprojection
On an organic substrate, Cr was deposited to a thickness of about 200 nm using a sputterer. A negative photoresist was coated on the deposited Cr layer, and using a photomask, UV was irradiated so as to form a reversed phase of a grid pattern including squares of 19 μm×19 μm. Further, the uncured area was removed using a photoresist stripper [the preparation was prepared].

Thereafter, a negative photoresist was coated on the Cr layer on which the pattern was formed to a thickness of 7 μm, and using index matching liquid and a diffuser, it was exposed to UV to form a photoresist (PR) including microprojections of the shape of a reversed circular truncated cone or reversed truncated polypyramid.

The photoresist (PR) including microprojections was surface-treated with fluorine, and then a mold was prepared using polydimethylsiloxane. Further, the mold was surface-treated with fluorine, and then polydimethylsiloxane was injected into the mold to prepare a film including microprojections.

(2) Formation of Fluorine-Based Compound Layer
A perfluoropolyether (PFPE) layer was deposited on the surface of the above-obtained film to a thickness of about 20 nm by thermal evaporation at a temperature of 400° C. and an evaporation speed of 2 Å/s under a vacuum condition of 2*10$^{-6}$ torr to form a fluorine-based compound layer.

Figure 9:
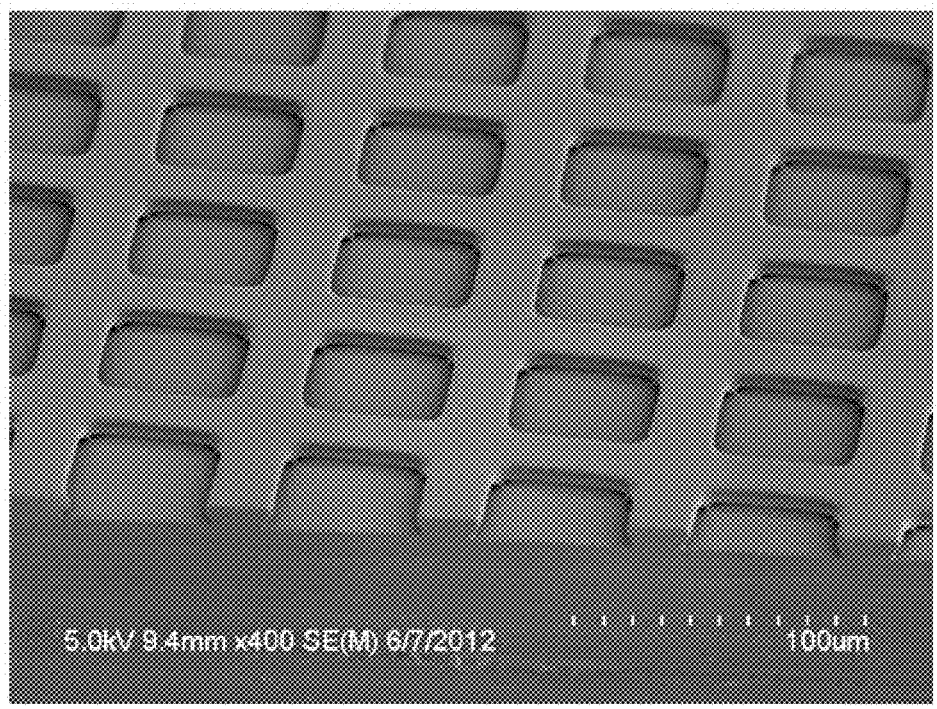
FIG. 9 respectively shows the cross-section of the film, and the SEM photograph of the plane when the film is viewed from the top, in Example 9.
Figure 9:
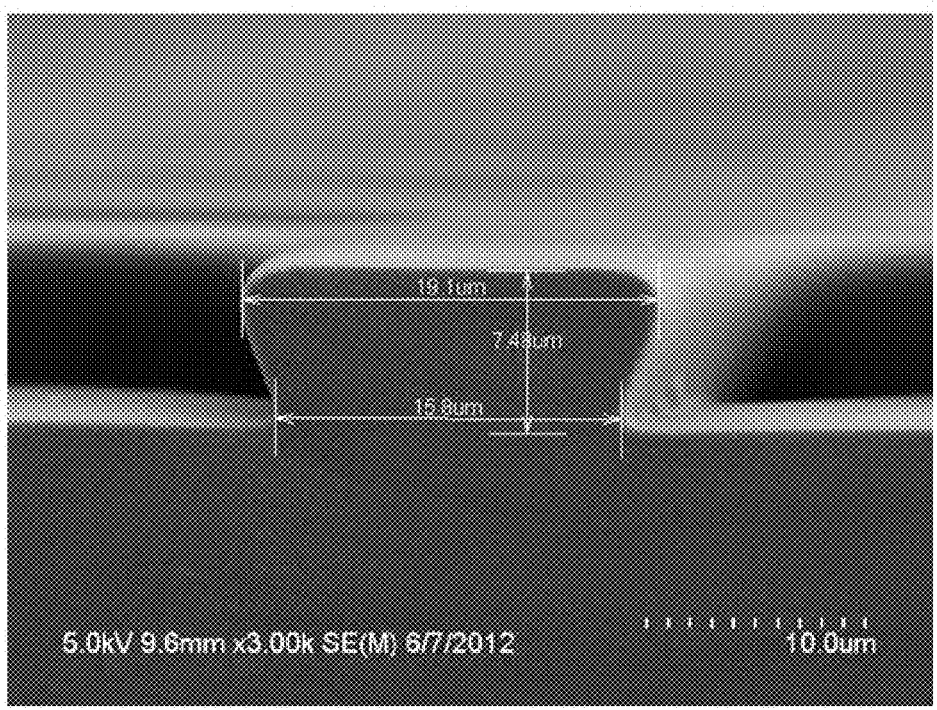

The cross-sectional view and the planar view of the film including continuous phase micropattern are shown in FIG. 9.

Example 10

A film including linear micropatterns was prepared and a fluorine-based compound layer was formed thereon by the same method as Example 8, except that the polymer injected into the mold was changed to polyurethane acrylate.

Figure 10:
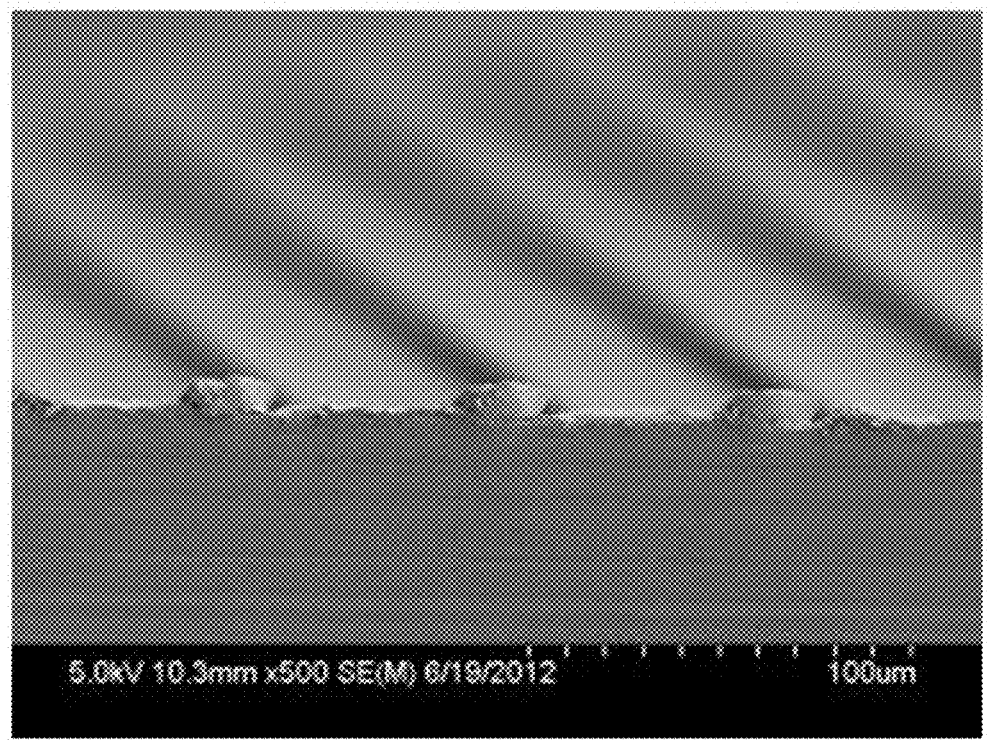
FIG. 10 respectively shows the cross-section of the film, and the SEM photograph of the plane, when the film is viewed from the top, in Example 10.
Figure 10:
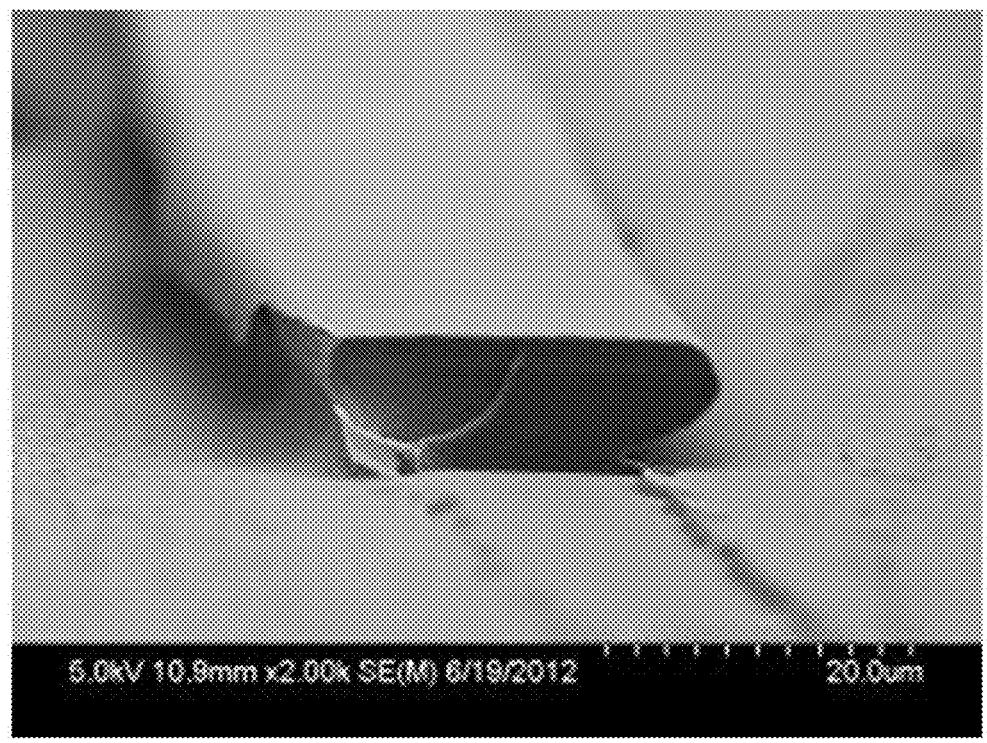

The cross-sectional view and the planar view of the film including linear micropatterns are shown in FIG. 10.

Example 11

A film including a continuous phase micropattern was prepared and a fluorine-based compound layer was formed thereon by the same method as Example 9, except that the polymer injected into the mold was changed to polyurethane acrylate.

Figure 11:
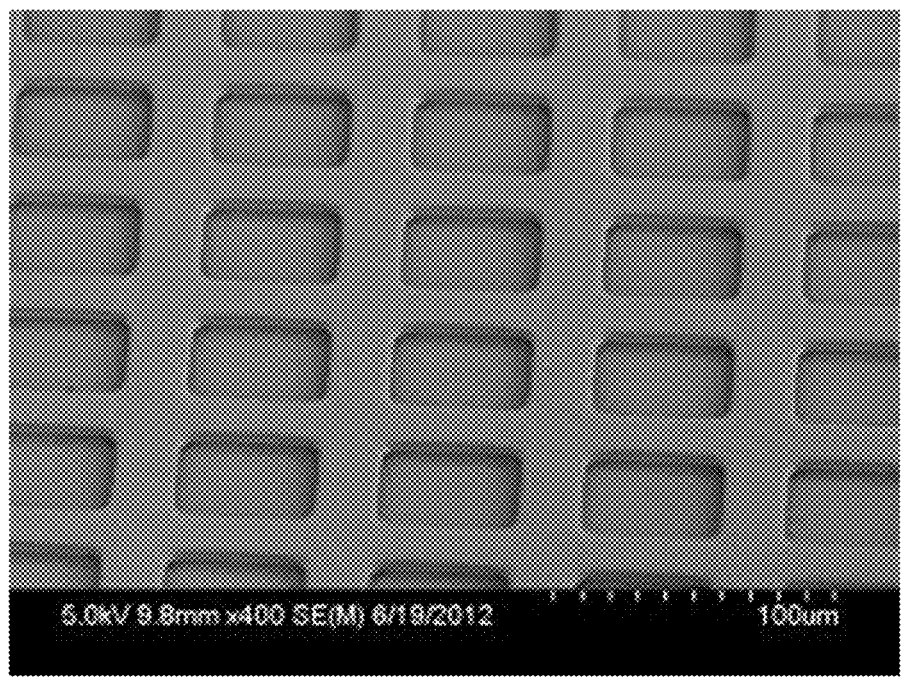
FIG. 11 respectively shows the cross-section of the film, and the SEM photograph of the plane, when the film is viewed from the top, in Example 11.
Figure 11:
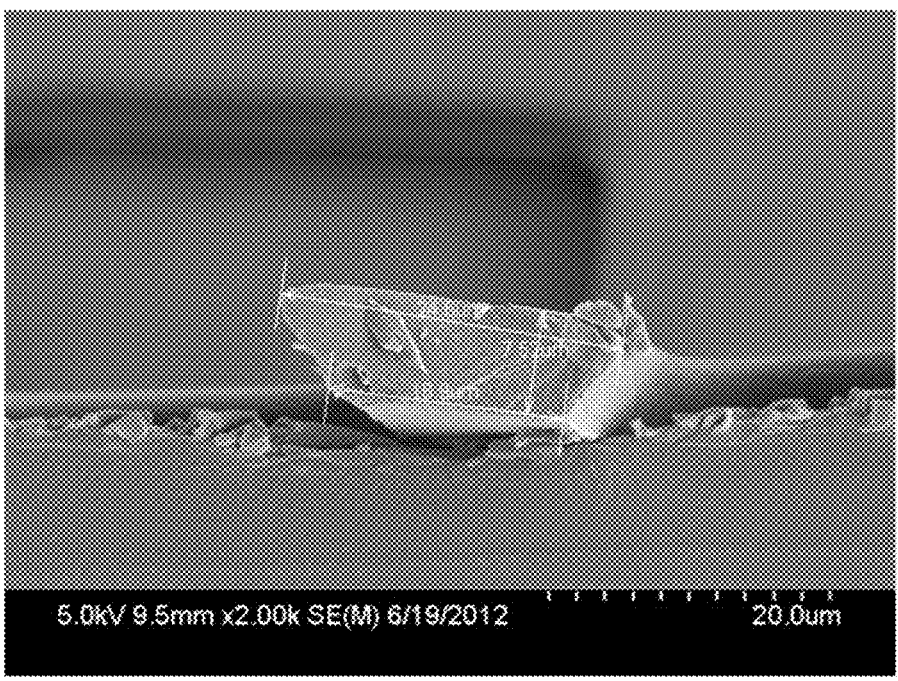

The cross-sectional view and the planar view of the film including the continuous phase micropattern are shown in FIG. 11.

Experimental Example: Measurement of Physical Properties of Film

1. Measurement of Static Contact Angle

By a tangent method, 3 µl each of water and oleic acid were put on the films obtained in the examples, and static contact angles were measured using a DSA 100 measuring apparatus. The measurement results are shown in the following Table 6.

TABLE 6

Measurement results of static contact angle

|  | 3 ul of distilled water | 3 ul of oleic acid |
|---|---|---|
| Example 8 | 152°/125° (having anisotropy) | 148°/100° (having anisotropy) |
| Example 9 | 136° | 139° |
| Example 10 | 152°/120° (having anisotropy) | 148°/76° (having anisotropy) |
| Example 11 | 137° | 123° |

As confirmed in Table 6, the films of Examples 8 to 11 have a high static contact angle to 3 ul of distilled water and 3 ul of oleic acid, and thus the films of the examples may simultaneously have water repellency and oil repellency.

2. Measurement Result of Pencil Hardness

For the films obtained in Examples 8 to 11, a 500 g weight was applied to measure pencil hardness by the method according to ASTM D 3363, and the results are shown in the following Table 8.

TABLE 8

|  | Pencil hardness |
|---|---|
| Example 8 | H |
| Example 9 | 4 H |
| Example 10 | HB |
| Example 11 | H |

As confirmed by Table 8, the films obtained in the examples have high surface hardness. Specifically, micropatterns of the above-explained specific structures are formed on the surface of the films obtained in the examples, thus affording mechanical properties such as higher durability, surface hardness, and the like.

3. Measurement of Optical Properties and Fingerprint Transcription Degree

The films of Examples 8 and 9 were respectively stacked on a 0.5 mm LCD glass, the transmittance and haze were measured, and the results are shown in the following Table 9. The transmittance and haze were measured on a light source A using an HM150 apparatus.

TABLE 9

Measurement results of transmittance and haze of the films of Examples 8 and 9

|  |  | Example 8 | Example 9 |
|---|---|---|---|
| Height of pattern (µm) |  | 7 | 7 |
| Width of pattern (µm) |  | 22 | 19 |
| Distance between patterns (or the largest diameter of the recess of pattern) (µm) |  | 73 | 73 |

|  |  | Transmittance (%) | Haze (%) | Transmittance (%) | Haze (%) |
|---|---|---|---|---|---|
| Before transcription | Reference Example | 93.3 | 0.2 | 93.3 | 0.2 |
|  | Example | 91.1 | 7.5 | 93.8 | 12.9 |
| After transcription | Reference Example | 93.8 | 4.0 | 93.8 | 4.6 |
|  | Example | 89.8 | 7.6 | 93.5 | 12.4 |
| Δ | Reference Example | 0.5 | 3.8 | 0.5 | 4.7 |
|  | Example | −1.3 | 0.1 | −0.3 | 0.1 |
| Transcription ratio (%) |  |  | 3% |  | 2% |

Δ: differential value between the transcribed amounts before and after transcription
transcription ratio: the ratio of Δ of the example to Δ of the reference example
The film of the reference example was prepared by thermally evaporating at a temperature of 400° C. and a deposition speed of 2 Å/s under a vacuum condition of 2 * 10$^{-6}$ torr, to form a perfluoropolyether (PFPE) layer of a thickness of 20 nm on an organic substrate.

As confirmed in the Table 9, the anti-fingerprint films of Examples 8 and 9 did not show a significant change in haze value before and after transcription of a fingerprint, and thus it was confirmed that the transcribed amount of the fingerprint is not large. To the contrary, it was confirmed that in the case of the reference example, the haze value largely increased after transcription of a fingerprint.

What is claimed is:
1. An anti-fingerprint film comprising:
a flat film; and
two or more nanoscale or microscale microprojections formed on the flat film, wherein the two or more nanoscale or microscale microprojections include two neighboring microprojections,
wherein each microprojection has a contact side contacting the flat film, an upper side facing the contact side, and a side wall connecting the contact side and the upper side,
wherein the nanoscale or microscale microprojections have a shape such that an internal angle formed by the side wall and the contact side is an obtuse angle,
wherein a ratio (D/P) of a longest diameter (D) of the upper side of one of the microprojections to a sum (P) of the distance between the upper sides of the two neighboring microprojections and the longest diameter of the upper side of one of the microprojections is 0.28 to 0.48, and wherein the anti-fingerprint film has an interaction energy ($K_A$) as defined by General Formula 1 in a range of 3 mJ/m² or less:

$$K_A = \left[\left\{\frac{\rho(2-3\cos\theta' + \cos^3\theta')}{3}\right\}^{1/3}\right] \frac{g}{2}\frac{(1+\cos\theta')}{(1+\cos\theta)}\left(\frac{m}{\pi}\right)^{2/3}\frac{\sin\alpha}{\sin\theta'}$$

[General Formula 1]

wherein, in General Formula 1,
α is a sliding angle of a liquid put on the anti-fingerprint film,
θ' is a contact angle formed by the anti-fingerprint film and the liquid,
θ is a contact angle formed by the flat film and the liquid,
ρ is the density of the liquid, m is the mass of the liquid, and g is gravitational acceleration.

2. The anti-fingerprint film according to claim 1, wherein the interaction energy ($K_A$) is 0.5 mJ/m² to 2.0 mJ/m².

3. The anti-fingerprint film according to claim 1, wherein the anti-fingerprint film has the sliding angle (α) to 30 μl of oleic acid of 20° or less.

4. The anti-fingerprint film according to claim 1, wherein the anti-fingerprint film has the contact angle (θ') of 120° or more to 3 μl of oleic acid and to 3 μl of distilled water.

5. The anti-fingerprint film according to claim 1, wherein the height of the microprojections is 0.1 μm to 40 μm.

6. The anti-fingerprint film according to claim 1, wherein the longest diameter of the upper side of the microprojections is 0.2 μm to 100 μm.

7. The anti-fingerprint film according to claim 1, wherein the internal angle formed by the side wall and the contact side is 100° to 170°.

8. The anti-fingerprint film according to claim 1, wherein the upper side is connected to the side wall while forming a curved surface therewith, and a ratio (r/D) of the internal radius of curvature (r) of the curved surface at which the side wall and the upper side are connected to the longest diameter (D) of the upper side of the microprojection is 0.1 or less.

9. The anti-fingerprint film according to claim 1, wherein the microprojections include at least one selected from the group consisting of glass, silicon, silicon doped with a metal, polysilicon, a silicon-based polymer, a metal, a urethane resin, a polyimide resin, a polyester resin, a (meth)acrylate-based polymer resin, a polyolefin resin, and a photosensitive polymer resin.

10. The anti-fingerprint film according to claim 1, further comprising a fluorine-based compound layer stacked on the outside of the microprojections, wherein the fluorine-based compound layer has a thickness of 5 nm to 5 μm.

11. The anti-fingerprint film according to claim 10, wherein the fluorine-based compound layer comprises a fluorine-based unimolecular compound, a fluorine-based polymer compound, or a mixture thereof.

12. An electrical and electronic apparatus comprising the anti-fingerprint film of claim 1.

* * * * *